(12) United States Patent
Hamilton et al.

(10) Patent No.: US 10,803,461 B2
(45) Date of Patent: Oct. 13, 2020

(54) FRAUD DETECTION IN PORTABLE PAYMENT READERS

(71) Applicant: Square, Inc., San Francisco, CA (US)

(72) Inventors: Shane Hamilton, El Cerrito, CA (US); Todd Aument, San Francisco, CA (US); Andrew Leiserson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 55 days.

(21) Appl. No.: 15/282,986

(22) Filed: Sep. 30, 2016

(65) Prior Publication Data

US 2018/0096330 A1    Apr. 5, 2018

(51) Int. Cl.
  *G06Q 20/40*    (2012.01)
  *G06Q 20/34*    (2012.01)
  *G06Q 20/32*    (2012.01)
  *G06Q 20/20*    (2012.01)

(52) U.S. Cl.
  CPC ......... *G06Q 20/4016* (2013.01); *G06Q 20/20* (2013.01); *G06Q 20/3224* (2013.01); *G06Q 20/341* (2013.01)

(58) Field of Classification Search
  CPC ..................................................... G06K 7/087
  USPC ............................................................ 705/18
  See application file for complete search history.

(56) References Cited

U.S. PATENT DOCUMENTS

| | | | |
|---|---|---|---|
| 5,204,902 A | 4/1993 | Reeds, III et al. | |
| 5,241,599 A | 8/1993 | Bellovin et al. | |
| 5,903,652 A | 5/1999 | Mital | |
| 6,105,012 A | 8/2000 | Chang et al. | |
| 6,148,404 A | 11/2000 | Yatsukawa | |
| 6,772,331 B1 | 8/2004 | Hind et al. | |
| 6,925,169 B2 | 8/2005 | Habu | |
| 7,302,564 B2 | 11/2007 | Berlin | |
| 7,333,602 B2 | 2/2008 | Habu | |
| 7,788,491 B1 | 8/2010 | Dawson | |

(Continued)

FOREIGN PATENT DOCUMENTS

CA    2 860 757 A1    7/2013
CA    2 948 481 A1    11/2015

(Continued)

OTHER PUBLICATIONS

Non-Final Office Action dated May 19, 2017, for U.S. Appl. No. 15/282,943, of Hamilton, S., et al., filed Sep. 30, 2016.

(Continued)

*Primary Examiner* — Russell S Glass
(74) *Attorney, Agent, or Firm* — Lee & Hayes, P.C.

(57) ABSTRACT

A payment reader and a POS terminal may communicate over a wireless connection. An original state of the payment reader can be used to determine a behavioral model, wherein the behavioral model defines an expected behavior of the payment entity. The system and method include detecting a change in the original state of the payment entity, wherein the change in the original state is triggered by another payment entity not authorized by the merchant; comparing the change of the original state with a threshold deviation defined by the behavioral model; and if the change of state is not within the threshold deviation, performing one or more actions to revert the payment entity to the original state.

16 Claims, 8 Drawing Sheets

(56) References Cited

U.S. PATENT DOCUMENTS

| | | |
|---|---|---|
| 7,929,702 B2 | 4/2011 | Brown et al. |
| 8,127,345 B2 | 2/2012 | Gregg et al. |
| 8,254,579 B1 | 8/2012 | Morgan et al. |
| 8,281,998 B2 | 10/2012 | Tang et al. |
| 8,472,629 B2 | 6/2013 | Hamachi |
| 8,494,165 B1 | 7/2013 | Monica et al. |
| 8,788,825 B1 | 7/2014 | Le et al. |
| 8,811,895 B2 | 8/2014 | Reisgies et al. |
| 8,874,913 B1 | 10/2014 | Monica et al. |
| 8,880,881 B2 | 11/2014 | Morel et al. |
| 8,978,975 B2 | 3/2015 | Barnett |
| 8,990,121 B1 | 3/2015 | Guise et al. |
| 9,082,119 B2 | 7/2015 | Ortiz et al. |
| 9,123,041 B2 | 9/2015 | Reisgies et al. |
| 9,141,977 B2 | 9/2015 | Davis et al. |
| 9,324,098 B1 | 4/2016 | Agrawal et al. |
| 9,519,901 B1 | 12/2016 | Dorogusker |
| 9,665,867 B2 | 5/2017 | Guise et al. |
| 9,727,862 B2 | 8/2017 | O'Connell et al. |
| 9,754,112 B1 | 9/2017 | Moritz et al. |
| 9,805,370 B1 | 10/2017 | Quigley et al. |
| 9,898,728 B2 | 2/2018 | Brudnicki et al. |
| 9,940,612 B1 | 4/2018 | Hamilton et al. |
| 10,163,107 B1 | 12/2018 | White et al. |
| 10,366,378 B1 | 7/2019 | Han et al. |
| 10,373,167 B2 | 8/2019 | Zovi et al. |
| 10,475,034 B2 | 11/2019 | Guise et al. |
| 10,546,302 B2 | 1/2020 | Zovi et al. |
| 2002/0035695 A1 | 3/2002 | Riches et al. |
| 2002/0188870 A1 | 12/2002 | Gong et al. |
| 2002/0194219 A1 | 12/2002 | Bradley et al. |
| 2003/0018878 A1 | 1/2003 | Dorward et al. |
| 2003/0177353 A1 | 9/2003 | Hiltgen |
| 2003/0200184 A1 | 10/2003 | Dominguez et al. |
| 2004/0094624 A1 | 5/2004 | Fernandes et al. |
| 2004/0104268 A1 | 6/2004 | Bailey |
| 2004/0153644 A1 | 8/2004 | McCorkendale et al. |
| 2006/0083187 A1 | 4/2006 | Dekel |
| 2006/0084448 A1 | 4/2006 | Halcrow et al. |
| 2006/0224892 A1 | 10/2006 | Brown |
| 2007/0067643 A1 | 3/2007 | Zhuk et al. |
| 2007/0141984 A1 | 6/2007 | Kuehnel et al. |
| 2008/0016537 A1 | 1/2008 | Little et al. |
| 2008/0017711 A1 | 1/2008 | Adams et al. |
| 2008/0244714 A1 | 10/2008 | Kulakowski et al. |
| 2009/0198618 A1 | 8/2009 | Chan et al. |
| 2010/0005132 A1 | 1/2010 | Choi et al. |
| 2010/0017602 A1 | 1/2010 | Bussard et al. |
| 2010/0260069 A1 | 10/2010 | Sakamoto et al. |
| 2010/0325735 A1 | 12/2010 | Etchegoyen |
| 2012/0124375 A1 | 5/2012 | Truskovsky et al. |
| 2012/0143706 A1 | 6/2012 | Crake et al. |
| 2012/0265685 A1 | 10/2012 | Brudnicki et al. |
| 2012/0330769 A1 | 12/2012 | Arceo |
| 2013/0023240 A1 | 1/2013 | Weiner |
| 2013/0119130 A1 | 5/2013 | Braams |
| 2013/0144792 A1 | 6/2013 | Nilsson et al. |
| 2013/0173475 A1 | 7/2013 | Lund |
| 2013/0204793 A1 | 8/2013 | Kerridge et al. |
| 2013/0227647 A1 | 8/2013 | Thomas |
| 2013/0268378 A1 | 10/2013 | Yovin |
| 2013/0268443 A1 | 10/2013 | Petrov et al. |
| 2013/0328801 A1 | 12/2013 | Quigley et al. |
| 2013/0332367 A1 | 12/2013 | Quigley et al. |
| 2014/0032415 A1 | 1/2014 | Lee et al. |
| 2014/0040139 A1 | 2/2014 | Brudnicki et al. |
| 2014/0075522 A1 | 3/2014 | Paris et al. |
| 2014/0158768 A1* | 6/2014 | Ray .................... H04K 3/825 235/449 |
| 2014/0237545 A1 | 8/2014 | Mylavarapu et al. |
| 2014/0279552 A1 | 9/2014 | Ortiz et al. |
| 2015/0012436 A1 | 1/2015 | Poole et al. |
| 2015/0032635 A1 | 1/2015 | Guise |
| 2015/0051960 A1 | 2/2015 | Barbaria et al. |
| 2015/0199689 A1 | 7/2015 | Kumnick et al. |
| 2015/0235212 A1 | 8/2015 | Ortiz et al. |
| 2015/0324792 A1 | 11/2015 | Guise et al. |
| 2016/0063480 A1 | 3/2016 | Ballesteros et al. |
| 2016/0104155 A1 | 4/2016 | Mcgaugh et al. |
| 2016/0196559 A1 | 7/2016 | Einhorn et al. |
| 2016/0307089 A1 | 10/2016 | Wurmfeld et al. |
| 2016/0307189 A1 | 10/2016 | Zarakas et al. |
| 2017/0068955 A1 | 3/2017 | Agarwal |
| 2017/0278104 A1 | 9/2017 | O'Connell et al. |
| 2018/0174131 A1 | 6/2018 | Brudnicki et al. |
| 2018/0181939 A1 | 6/2018 | Hamilton et al. |
| 2018/0332016 A1 | 11/2018 | Pandey et al. |
| 2019/0287108 A1 | 9/2019 | White et al. |

FOREIGN PATENT DOCUMENTS

| | | |
|---|---|---|
| EP | 2 996 095 A1 | 3/2016 |
| JP | 2002-259866 A | 9/2002 |
| JP | 2003-500923 A | 1/2003 |
| JP | 2004-153711 A | 5/2004 |
| JP | 2006-293747 A | 10/2006 |
| JP | 2009-140275 A | 6/2009 |
| JP | 2015-201091 A | 11/2015 |
| JP | 2017-524312 A | 8/2017 |
| JP | 2018-125876 A | 8/2018 |
| WO | 2009/107349 A1 | 9/2009 |
| WO | 2013/109370 A2 | 7/2013 |
| WO | 2015/171939 A1 | 11/2015 |
| WO | 2018/063812 A1 | 4/2018 |

OTHER PUBLICATIONS

Menezes, A.J., et al., "Handbook of Applied Cyptography, Motivation for Use of Session Keys, Key Transport Based on Public-Key Encryption, Hybrid Key Transport Protocols Using PK Encryption," Handbook of Applied Cryptography, CRC Press, pp. 494, 506, 507, 512, 513, 514 & 559 (Jan. 1, 1997).

"Wi-Fi Certified Wi-Fi Direct," Wi-Fi Alliance, published Oct. 2010, Retrieved from the Internet URL: http://www.wi-fi.org/knowledge-center/white-papers/wi-fi-certified-wi-fi%C2#AEconnect-devices, on Oct. 16, 2012, pp. 1-14.

Non-Final Office Action dated Jan. 18, 2013, for U.S. Appl. No. 13/353,156, of Monica, D., et al., filed Jan. 18, 2012.

Notice of Allowance dated Apr. 2, 2013, for U.S. Appl. No. 13/353,156, of Monica, D., et al., filed Jan. 18, 2012.

Non-Final Office Action dated Jan. 29, 2014, for U.S. Appl. No. 13/353,229, of Morel, S., et al., filed Jan. 18, 2012.

Non-Final Office Action dated Mar. 25, 2014, for U.S. Appl. No. 13/939,629, of Monica, D., et al., filed Jul. 11, 2013.

Notice of Allowance dated Jun. 23, 2014, for U.S. Appl. No. 13/939,629, of Monica, D., et al., filed Jul. 11, 2013.

Notice of Allowance dated Jul. 10, 2014, for U.S. Appl. No. 13/353,229, of Morel, S., et al., filed Jan. 18, 2012.

Non-Final Office Action dated Dec. 5, 2014 for U.S. Appl. No. 14/273,447, of Guise, M.J., et al., filed May 8, 2014.

Notice of Allowance dated Jan. 5, 2015 for U.S. Appl. No. 14/273,447, of Guise, M.J., et al., filed May 8, 2014.

Non-Final Office Action dated Oct. 1, 2015, for U.S. Appl. No. 13/800,610, of Quigley, O.S.C., et al., filed Mar. 13, 2013.

Final Office Action dated Apr. 22, 2016, for U.S. Appl. No. 13/800,610, of Quigley, O.S.C., et al., filed Mar. 13, 2013.

Examiner Requisition for Canadian Patent Application No. 2,860,757, dated Jan. 23, 2017.

Notice of Allowance dated Jan. 27, 2017 for U.S. Appl. No. 14/614,350, of Guise, M.J., et al. filed Feb. 4, 2015.

Non Final Office Action dated Mar. 14, 2017, for U.S. Appl. No. 13/800,610, of Quigley, O.S.C., et al., filed Mar. 13, 2013.

Final Office Action dated Nov. 15, 2017, for U.S. Appl. No. 13/800,610, of Quigley, O.S.C., et al., filed Mar. 13, 2013.

Non-Final Office Action dated Dec. 22, 2017, for U.S. Appl. No. 14/273,449, of Guise, M.J., et al., filed May 8, 2014.

Examiner Requisition for Canadian Patent Application No. 2,860,757, dated Feb. 2, 2018.

(56) References Cited

OTHER PUBLICATIONS

English-language translation of Decision to Grant a Patent for Japanese Patent Application No. 2017-511546, dated Feb. 23, 2018.
Final Office Action dated Aug. 28, 2018, for U.S. Appl. No. 14/273,449, of Guise, M.J., et al., filed May 8, 2014.
Notice of Allowance dated Sep. 12, 2018, for U.S. Appl. No. 13/800,610, of Quigley, O.S.C., et al., filed Mar. 13, 2013.
International Search Report and Written Opinion for International Application No. PCT/US2012/069897, dated Aug. 26, 2013.
International Search Report and Written Opinion for International Application No. PCT/US2015/029763, dated Jul. 28, 2015.
Extended European Search Report for European Patent Application No. 15789231.6, dated Sep. 8, 2017.
Notice of Allowance dated Dec. 4, 2017, for U.S. Appl. No. 15/282,943, of Hamilton, S., et al., filed Sep. 30, 2016.
International Search Report and Written Opinion for International Application No. PCT/US2017/051502, dated Dec. 8, 2017.
Denning, E.D., "Field Encryption and Authentication", Advances in Cryptology: Proceedings of Crypto, pp. 1-17 (1983).
Denning, R.E.D., "Cryptography and Data Security," Purdue University (1982), pp. 1-199 [Part-1].
Denning, R.E.D., "Cryptography and Data Security," Purdue University (1982), pp. 200-209 [Part-2].
Koch, H.S., et al., "The application of cryptography for data base security," AFIPS National Computer Conference, dated Jun. 7-10, 1976, pp. 97-107.

"Security Requirements for Cryptographic Modules," National Institute of Standards and Technology, FIPS PUB 140-1, on Jan. 11, 1994, pp. 1-69.
Examiner Requisition for Canadian Patent Application No. 2,860,757, dated Jan. 8, 2019.
Office Action for European Patent Application No. 15 789 231.6, dated Jan. 8, 2019.
English-language translation of Notice of reasons for refusal for Japanese Patent Application No. 2018-054964, dated Jun. 24, 2019.
Examiner Report No. 1 for Australian Patent Application No. 2015255884, dated Jul. 12, 2019.
Notice of Allowance dated May 28, 2019, for U.S. Appl. No. 14/273,449, of Guise, M.J., et al., filed May 8, 2014.
Non Final Office Action dated Sep. 18, 2019, for U.S. Appl. No. 14/965,112, of Zovi, D.D., et al., filed Dec. 10, 2015.
Non-Final Office Action dated Feb. 25, 2020, for U.S. Appl. No. 15/897,662, of Hamilton, S., et al., et al., filed Feb. 15, 2018.
Restriction requirement dated Feb. 27, 2020, for U.S. Appl. No. 15/497,388, of Guise, M.J., et al., filed Apr. 26, 2017.
Non-Final Office Action dated Mar. 3, 2020, for U.S. Appl. No. 15/859,217, of Funk, M., filed Dec. 29, 2017.
Examination Report No. 1 for Australian Patent Application No. 2017335584, dated Jan. 22, 2020.
Summon to Oral Proceedings dated Jan. 31, 2020, for EP Application No. 15789231.6 filed on May 7, 2015.

\* cited by examiner

FRAUD DETECTION IN PORTABLE PAYMENT READERS

BACKGROUND

Retail transactions such as purchases may be performed with payment instruments such as a credit card or an NFC-enabled smart phone running a payment application. A traditional payment terminal may reside at a fixed location and may have a physical connection to a power source such as an AC outlet. The payment terminal may also be physically connected to a wired communication interface such as a phone line or Ethernet connection. The payment terminal receives payment information such as a credit card number from the payment instrument and communicates with a remote server such as a payment server to determine whether the transaction is approved.

Such a traditional payment terminal may not be suitable for many businesses. Taxis, food trucks, delivery services, professional service providers, and other similar businesses engage in transactions from a vehicle or at disparate locations. Applications running on a mobile device such as smart phone or tablet may provide a user interface to facilitate payment transactions and a communication interface for communicating with the payment server. However, a separate payment reader may be necessary in order to interface with the payment instrument. The payment reader may be portable and communicate wirelessly with the mobile device. In some instances, multiple payment readers and mobile devices may be located within the same area, causing difficulty in determining which POS terminals should communicate with which payment readers.

BRIEF DESCRIPTION OF THE DRAWINGS

The above and other features of the present disclosure, its nature and various advantages will be more apparent upon consideration of the following detailed description, taken in conjunction with the accompanying drawings in which.

Figure 1A:
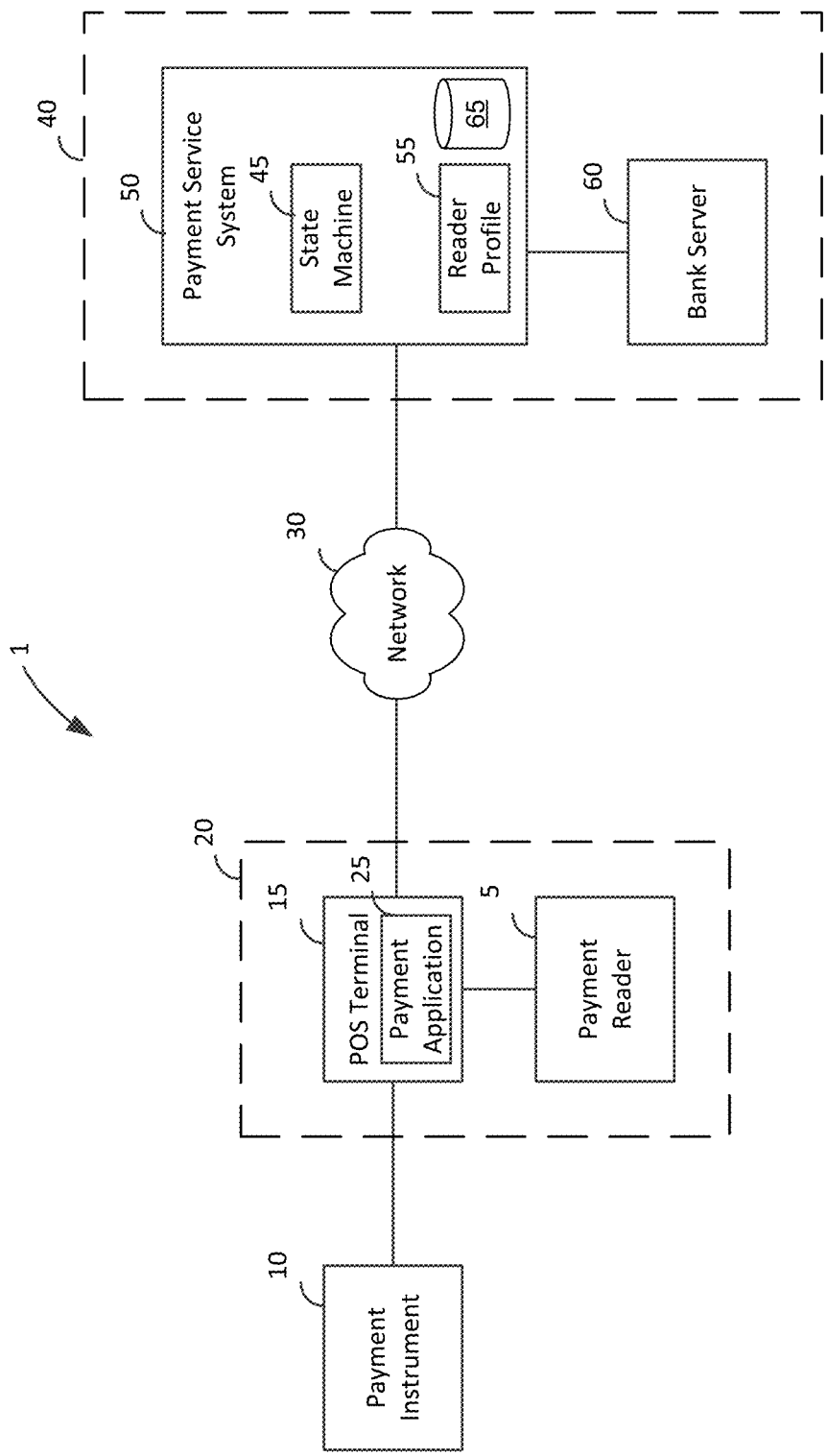
FIG. 1A depicts an illustrative block diagram of a payment system in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment system may include a point-of-sale (POS) terminal and a payment reader. The payment reader may physically interact with payment instruments such as magnetic stripe payment cards, EMV payment cards and NFC payment instruments. The POS terminal may provide a rich user interface, communicate with the payment reader, and also communicate with a payment server. In this manner, the POS terminal and payment reader may collectively process transactions between a merchant and a customer.

The payment reader and the POS terminal may communicate over a wireless connection such as Bluetooth low energy (BLE). The POS terminal may be a mobile device running a point-of-sale application. During typical operation, numerous mobile devices will be within range of the payment reader. Furthermore, there may be several payment readers within the range of the mobile devices. In order to manage its connections, the payment reader may establish a procedure for maintaining a connection with a mobile device belonging to the merchant, for example through Bluetooth or BLE communication protocols.

The payment reader may initially be in an unpaired state, in which it is not bonded to any mobile device. In response to a user input such as a button push, the payment reader may send a pairing request message such as an advertising message. If a mobile device running a point-of-sale application receives the advertising message, and a user of the mobile device indicates a desire to pair with the payment reader, the payment reader and the mobile device may pair and enter into a bonded state. While in the bonded state the payment reader and the mobile device may periodically connect and engage in payment transactions. However, in certain scenarios, the pairing request can happen automatically and without authorization from the user, as per certain user settings, or if a fraudulent user gets access to the button push. For example, the fraudulent user may use this technique to physically swap a portable and wirelessly connected legitimate payment reader with a fraudulent payment reader (that is a reader belonging to the fraudulent user) unbeknownst to the actual user or merchant. The fraudulent user wishing to pair the fraudulent payment reader to the merchant mobile device may provide a user input such as a button push, which may not cause the payment reader to provide the advertising message with the request to pair and instead may automatically cause merchant's device to connect to the second but fraudulent payment reader. Now, the fraudulent payment reader is connected to the merchant mobile device whereas the merchant's payment reader is connected to the fraudulent user's mobile device. When the customer provides the payment instrument for purchase, the fraudulent user charges his or her own payment instrument with the correct sale amount, in order to give the impression to the customer and merchant that a proper sale has been consummated. The fraudulent user, however, charges a fraudulent amount to the customer since the reader with which the customer is interacting, again unbeknownst to the customer, is fraudulent and in fraudster's control. The customer may realize the discrepancy on receiving a payment receipt or the merchant may realize the pairing anomaly on the next transaction, however the fraudster may have already left the store after causing considerable damage in a single transaction. This is an unfavorable and unacceptable application of portable payment readers that operate on wireless and non-secure communication protocols.

In some scenarios, the fraudulent user does not even need to connect their reader to the merchant's mobile device as long as the fraudulent user has access to the merchant's reader. The fraudulent transactions can be performed on the merchant's reader while the merchant and customer are figuring out why their transaction is not working like it should and why the merchant reader shows as unpaired. By the time the merchant realizes an unrecognized reader or a reader that is disconnected to the merchant's payment terminal, the fraudulent user may have already caused financial damage. In other words, a bad actor can swap a merchant's reader with their own reader, and then while watching the payment flow of the merchant from across the room, charge their own card the actual amount using the merchant's reader, and charge the merchant's customer a much higher amount using the bad actor's reader.

To this end, in one implementation, the present disclosure discloses methods and systems to prevent swapping of a payment reader with another reader by tracking behavior of readers in the field and developing a specific model for the reader based on the behavioral analysis. In some embodiments, the behavioral model also predicts and includes within the model past, current, or predicted future state of the entire merchant environment. Any new state that is a deviation from the predicted state as defined by the model and where the deviation exceeds a threshold, is indicative of an unknown and risky behavior, akin to a fraud attack. On detecting that a behavior has changed, the server that perform the behavioral analysis sends notification to the merchant to check if the deviation in behavior is normal. If the behavior is indicated to be normal, the server initiates the process of authorizing the new reader. If the behavior is not indicated to be normal, the server cancels any ongoing transactions and alerts the merchant.

In another implementation, a merchant reader can learn its regular position in relation to the merchant's point of sale terminal, in terms of either consistent movement or consistent same location or both. In the event of a "switcharoo" attack, the merchant reader would change to a new location across the room and remain relatively stable. This should trigger the reader purge the connection to the seller's point of sale terminal, forcing them to repair. The merchant would then attempt to repair to the bad actor's device, which would then stop the attack. The merchant will then have their account associated to a bad actor's device.

In another implementation, the present subject matter discloses a method to obtain an original state of a payment entity, such as a payment reader or a POS terminal, based on a behavioral model that defines an expected behavior of the payment entity. The methods and systems detect a change in the original state of the payment entity, for example, if the payment entity moves in a manner different from its normal behavior, disconnects or connects with a new device, and so on. The server compares the change of the original state with a threshold value, also referred to as threshold deviation, defined by the behavioral model and if the change of state is not within the threshold deviation, the server either reverts the payment entity to the original state or notifies the merchant to take corrective actions.

Another kind of attack is contemplated in the present subject matter. Essentially, the fraudulent user can convert the merchant's reader into a skimmer by wirelessly connecting to the merchant's payment reader and downloading malware on the reader. To do so, the fraudulent user pairs his/her mobile device to the merchant mobile device by providing a user input such as a button push, when the merchant is not looking. Then through the mobile device of the fraudulent user, the fraudulent user can download suspicious software scripts or malware on the payment card reader, thereby taking complete control of the reader and all the data stored thereon unbeknownst to the merchant. Once the software or hardware of the payment reader is successfully tampered with, fraudulent user does not even need to be at the merchant location to carry out fraudulent activities.

To this end, in one implementation, the payment server stores the association between a payment application executing on a mobile device, such as payment terminal, and a payment reader. Each payment application is connected to a merchant and thus their financial account. Anytime there is a fraudulent user attempting to connect their device, and thereby, their financial account, to the reader, a request is sent to the server to compare whether the payment application executing on the new device, if any, is connected to the card reader. If not, the primary merchant on the original payment application is sent a notification to confirm association of the second device executing a different payment application. Various other conditions may trigger the generation of request, for example, introduction of a new reader, introduction of a previously known but disabled reader, introduction of a new payment application, introduction of a previously known but disabled payment application, addition of a new financial account, addition or association of a previously disabled financial account, and so on.

The above systems and methods allow for a secure payment environment that prevents fraud due to swapping of card readers or spoofing of software merchant payment applications, which is further described below through figures and claims.

Various embodiments and implementations of the disclosed fraud detection technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some embodiments," "according to various embodiments," "in the embodiments shown," "in one embodiment," "in other embodiments," "various embodiments," "some embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "component" refers broadly to software stored on non-transitory storage medium (e.g., volatile or non-volatile memory for a computing device), hardware, or firmware (or any combination thereof) components. Components are typically functional components that can generate useful data or other output using specified input(s). A component may or may not be self-contained. An application program (also called an "application") may include one or more components, or a component can include one or more application programs.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the figures, FIG. 1 depicts an illustrative block diagram of a payment system 1 in accordance with some embodiments of the present disclosure. In one embodiment, payment system 1 includes a payment instrument 10, payment terminal 20, network 30, and payment server 40. These components of payment system 1 facilitate electronic payment transactions between a merchant and a customer.

The electronic interactions between the merchant and the customer take place between the customer's payment instrument 10 and the merchant's payment terminal 20. The customer has a payment instrument 10 such as a credit card having magnetic stripe, a credit card having a magnetic stripe, an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment instrument 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20. In on implementation, the payment server 40 includes a payment service system 50 and a bank server 60 collectively operating to permit or reject payment transactions.

Based on the information that is received at payment terminal 20 from payment server 40, the merchant may indicate to the customer whether the transaction has been approved. In some embodiments such as a chip card payment instrument, approval may be indicated at the payment terminal, for example, at a screen of a payment terminal. In other embodiments such as a smart phone or watch operating as a NFC payment instrument, information about the approved transaction and additional information (e.g., receipts, special offers, coupons, or loyalty program information) may be provided to the NFC payment instrument for display at a screen of the smart phone or watch or storage in memory.

In one implementation, the payment terminal 20 further includes a payment reader 5 and a POS terminal 15, such as a mobile device executing thereon a payment application 25. In one implementation, the POS terminal 15 can be a POS terminal operated and managed by a merchant(s). Furthermore, the POS terminal 15 can be of a varied hardware and/or software configuration, such that POS terminal 15 may be an Android device or an iOS device. In another example, POS terminal 15 can be a cellphone or a tablet computer. The POS terminal 15 can be an electronic point-of-sale system that is connected to the payment reader 5, which is capable of accepting a variety of payment instruments, such as credit cards, debit card, gift cards, near-field communication (NFC) based payment instruments, and the like.

The payment reader 5 may be a portable magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment instrument. Accordingly, the payment reader 5 may include hardware implementation, such as slots, magnetic tracks, and rails with one or more sensors or electrical contacts to facilitate detection and acceptance of a payment instrument 10. Additionally or optionally, the payment reader 5 may also include a biometric sensor to receive and process biometric characteristics and process them as payment instruments, given that such biometric characteristics are registered with the payment service system 50 and connected to a financial account with a bank server 60.

The term "registration application" or "payment application" as used here, refers to any registration application that enables communication between users (e.g., sender and recipient of a message) over a wired or wireless communications network. The registration application 25 can be employed by a service provider that delivers a communication service to users, e.g., chat capability or capability to enter payment information, for example through a form. The registration application 25 may include one or more components and/or engines, or a component and/or engine can include one or more applications. The registration application 25 can include, for example, a mobile payment application, a text messaging application for communication between phones (e.g., conventional mobile telephones or smartphones), or a cross-platform instant messaging application for smartphones and phones that use the Internet for communication.

The registration application 25 can also include, for example, a web browser application installed on the POS terminal 15 of the merchant accessible via a uniform resource locator (URL). In some embodiments, the URL is identified by a graphical user interface (GUI) of a mobile payment application installed on the POS terminal 15.

In one implementation, the merchant uses the registration application 25 to register the payment reader 5 with an account association with the registration application 25, for example at the time of pairing or bonding the payment reader 5 with the POS terminal 15. The server 40 can store such relationships between the payment reader 5 and the POS terminal 15 either locally or within the server 40 in specific data structures. In case of multiple readers, similar to payment reader 5, being connected to the POS terminal 15, the server 40 can also store the hierarchy of readers, the identity of such readers, profile of the readers, and location of the readers with respect to the POS terminal, among other things.

If payment reader 5 or any other reader connected to the POS terminal 15 changes state with respect to a current state, the server 40 generates a notification, e.g., via the state machine 45, to indicate to the merchant that an anomaly has occurred. In one implementation, any current transactions may be paused until the merchant has verified the state of all readers, or if the server indicates presence of an unknown reader in proximity to the POS terminal 15. In this manner, the server 40 indicates states with respect to readers that are not just connected to the POS terminal 15 but are also within a certain territory. It will be understood that location or reader identity is used as example only, the server can also determine change of state in the context of change in hierarchy of payment readers, detection of another merchant account by detection of a new registration application 25.

The state machine 45, in one implementation, stores the states of the reader or readers 5 associated with a merchant account or payment application 25 in a database 65, as a data structure hereinafter referred to as reader profile 55. The reader profile 55 corresponds to the identity of the reader 5, such as in terms of registration number of the reader 5, unique identifier, association of the reader 5 with a payment or merchant account, the association of the reader 5 with a mobile or POS terminal on which a payment application is executing and so on. The reader model or profile 55 can also correspond to the behavior or behaviors associated with the reader 5 and collected and analyzed over time, or even an explicit or desired behavior set at the time of registration. Examples of such behavior includes determination of territory in which the reader 5 operates and accordingly determine, the "movement" profile, for example the merchant may move the reader from one terminal to another terminal, may move the reader laterally or only in a certain direction, or may not move the reader at all, such "movement" behaviors can be stored in movement profiles. The reader profile 55 can also include the number of readers within a defined territory and placement of a reader with respect to other readers or terminals connected to a payment application. The state machine 45 checks the system 1 at predefined time intervals or at random time intervals to determine whether the state of the reader has deviated, above or below a threshold level, from the reader profile 55. If the state machine 45 identifies a deviation of behavior, the state machine 45 contacts the merchant through a communication identifier, e.g., email address, phone number, etc., stored in the payment server 40. The notification may indicate to the merchant that there is potentially a new reader or new behavior, which may be a fraudulent attempt.

In one implementation, the state machine 45 can obtain reader profile through several ways. In one example, the state machine 45 obtains the reader profile by querying readers within a defined geographical boundary at random or predefined intervals. The queries are configured to obtain information related to power levels, signal strength, location, and other such parameters, that may indicate a behavior of a reader over time. The state machine 45 sends the queries to a list of readers or any reader within the proximity of a payment object reader that is broadcasting or is otherwise available on a communication protocol. The state machine 45 stores a reader profile including behavior at the time of registration of the reader and subsequent association of the reader to a payment application. The state machine 45 can also store the behavior of the reader 5 with respect to the POS terminal 15. In one implementation, the payment reader 5 includes device detection components (not shown) including, but not limited to, sensors, detectors, radio frequency transmitters and/or receivers. By leveraging the sensing capabilities of these components, the POS terminal 15 can determine a state of the payment reader 5 at any time. The POS terminal 15 can set a geo-fence within which to track reader profiles. In actuality, some readers may be outside the actual store but within the geo-fence established by the POS terminal 15. In another implementation, the POS terminal 15 receives information from all computing devices irrespective of their distance from the POS terminal 15. In another implementation, the POS terminal 15 may query or target a specific reader within a geographical or logical fence or having a specific IMEI or MAC address, etc.

The present disclosure leverages on the fact that each reader profile is unique and any deviation owing to subtle differences introduced, for example due to a fraudster attempting to swap a reader with their own or by spoofing a merchant through their payment application, is detectable and helps facilitate a bad actor to take control of the sensitive information.

The reader profile 55 can be based on performance characteristics for each reader. These characteristics are generally too subtle or negligible to be observable by a naked eye or be distinguished by a generic computer. For example, various design characteristics may impact the quality of the speech and data services provided by reader and its ability to provide communications in varying radio environments, like the radio front-end of the mobile device, which drives, in part, the radiated performance (a devices ability to receive and transmit radio signals) of the device may positively or negatively impact the quality of communications in various radio environments. Another factor may be the device's capability to cancel interfering radio signals from wanted radio signals in order to reduce the signal-to-noise ratio and thereby improve the quality of communications. Other design factors include (a) the performance of the device's digital signal processor, (b) the design of the device's operating system and associated applications including the handling of TCP/IP communication. As a result, reader 5 may have varying performance characteristics due to their design. In other words, reader 5 operating in the same radio environment may provide different qualities of communication.

As suggested previously, wireless devices like reader 5 utilize radio waves to support communication over distance. The reader 5 transmits and receives information via the radio waves, which may be carried over predetermined frequency bands. An antenna connected to a transmitter and a receiver, along with the associated circuitry, allows the reader 5 to transmit and receive these radio wave signals. The design of the wireless reader 5, including the antenna and the various transmit- and receiver-related components, impacts the ability of the reader 5 to transmit and receive radio wave signals, and hence defines and affects the radiated performance of the device, which as mentioned in the previous paragraph can be measured to differentiate one device from another. Some of the methods are described hereinafter.

In one implementation, the POS terminal 15 extracts or reads specific characteristics, e.g. physical, radio, magnetic, wireless, and the like, from the reader 5. For example, the POS terminal 15 obtains radio fingerprints of the reader 5 by allowing its radio frequency transmitter and receiver to interact with the respective antenna transmitter and receiver of the reader 5, for example on a specific or selected frequency bands. It is assumed that the reader 5 is operating over a wide range of radio frequencies and output power levels. The cellular telephone devices, which are now common, for example, operate in the 800-900 MHz or 1700-1900 MHz range and at power levels of about 600 mW while blue tooth devices operate in the 2.4 GHz range at significantly lower power levels. The reader 5 may send signals to the POS terminal 15 and vice versa on the frequency and at the power levels understood by devices 108, where the responses to the signals from the reader 5 help identify and generate a profile of the reader 5 to a reasonable accuracy. The signals are within Specific Absorption Rate (SAR) limitations. In some implementations, the reader 5 provides radio fingerprints in the form of transmission and reception measurements of the reader 5. The transceiver of the POS terminal 15 may obtain transmission measurements for example, among other things a measurement of the phase error, of the frequency error, of the power and of the spectrum, RSSI, RSSI vs. frequency measurements. In reception measurements, bit error rates may be measured. In one implementation, the reader 5 and/or the POS terminal 15 may include additional components, e.g., antenna elements, diplexers, antenna coupler, and the like, to facilitate or obtain more accurate measurements.

In another example, the radio fingerprints correspond to radiated performance characteristics, such as Effective Isotropic Radiated Power ("EIRP"), receiver sensitivity, Total Radiated Power ("TRP"), Total Isotropic Sensitivity ("TIS"), and envelope correlation, which is related to receiver diversity performance. These characteristics are also unique to a reader and its positive with respect to a POS terminal 15 given their design differences, given that all other signal propagation factors, such as propagation paths, physical environment, and the like remaining same. This is because in a wireless communication system, an RF modulated signal from a transmitter may reach a receiver via a number of propagation paths. The characteristics of the propagation paths typically vary over time due to a number of factors such as fading and multipath. Further, structures such as buildings, and surrounding terrain, including walls, contribute to the scattering and reflection of the transmitted signal. The scattering and reflection of the transmit signal results in multiple signal paths from the transmitter to the receiver. The contributors to the multiple signal paths change as the receiver moves. Other signal sources also contribute to the degradation of the desired signal. The other signal sources may be other transmitters intentionally operating on the same frequency as the desired signal, as well as transmitters that generate spurious signals in the frequency band of the desired signal. Yet another source of signal degradation may be generated within the receiver itself. Signal amplifiers and signal processing stages within the receiver may degrade the level of the desired signal with respect to the level of thermal noise. The signal amplifiers and processors within the receiver may also generate noise products or distort the received signal and further degrade its quality. The calculated value of the radiated performance characteristics, based on measurements described herein, may then be stored for future detection of the wireless device. At a future time, the radiated performance characteristics are compared to the stored values, in order to determine a radiated performance approval and/or certification of the wireless device.

Both during the tracking, detection and registration of the reader 5, the reader 5 may be placed in an anechoic chamber to provide RF isolation from the external environment and allow for the execution of detection of the reader 5 on the same frequency channels as used during the time of device registration.

Besides or in addition to radio fingerprints mentioned above, the payment reader 5 provides its profile through the wireless transmitter and receiver and over Wi-Fi or Bluetooth communication protocols. In one implementation, the transmitter of the POS terminal 15 obtains the fingerprints from the reader 5 by transmitting and receiving command and control parameters to and from the reader 5. The command and control parameters place the reader 5 in a detect mode and determine the quality and operations of a radio frequency (RF) link established between the wireless device and the base station. The wireless data communications link is also used to transmit command and control parameters from the wireless device to the base station. The quality of the RF link is stored in a database as wireless fingerprint of the device. At a future instance, the device 5 can be detected by re-establishing an RF link and determining the quality to be similar to one of the stored values, where each value corresponds to a unique device. In some implementations, the uplink and/or downlink data speed through the RF link may be used as parameters to detect a reader 5 from amongst other devices.

In another implementation, the reader 5 measures or provides the manufacturing or engineering tolerances of the sub-components embedded in the reader 5 and how they change with the change in reader position. For example, the payment object reader 110 can measure the performance of microphone, accelerometer or other such sensors. In another example, the reader 5 can measure the defects or anomalies in a particular device that are unique to the device.

In another implementation, the POS terminal 15 is configured to detect any open communication ports in the reader 5 and generate, on-the-fly for example, schemes to communicate detection sequences to the reader 5. The schemes are configured based on a communication protocol corresponding to the open port. The POS terminal 15 also tracks the movement of the reader and stores such behavior in the reader profile. For example, through accelerometers or antennas, the POS terminal 15 can track, over time, the movement behavior of the reader 5. Thus, the behavior indicates that the reader moves within a certain geo-fence or stays stable on certain days, times, or months.

The POS terminal 15 sends a request to the buyer device 108 to open some communication ports to allow access of the devices 108. The POS terminal 15 also sends requests to allow the POS terminal 15 to make the measurements. Not just that, the POS terminal 15 requests whether it can store such information for future use, as reader profile. Furthermore, the POS terminal 15 requests the merchant to decide whether they would prefer the measurements to be stored locally or remotely. In other cases, the payment reader 5 or even the merchant may make that determination either on the basis of the merchant location or on a transaction-to-transaction basis.

After obtaining the reader profile or behaviors such as information related to the radiated performance, defects, manufacturing or engineering tolerances, etc., the reader 5 or the POS terminal 15 stores such behavioral or fingerprint data for future use such as detection and tracking of the reader movement. The reader 5 may store such data locally within the reader or in a connected device, such as a POS terminal 15, or remotely in a server, such as a payment server 40. The POS terminal 15 also facilitates storage of the reader behavior or profile and maps the reader and terminal information to the merchant via payment application so as to create a relationship between the payment application and the reader. Such relationships may be saved in various formats, such as charts, semantic maps, taxonomies, trees, and the like, and are also saved in reader profiles 55.

When a reader whose device fingerprints or reader profile 55 enters the geo-fence of a merchant location, the POS terminal 15 determines a new reader profile based on the entry of a new reader and compares whether the new reader profile matches with the existing reader profile, or whether the new reader profile is connected with the merchant application different from existing merchant application. If the terminal 15 identifies the reader profile and no deviation is determined as per threshold, the terminal 15 processes the transaction. However, if there is a substantial deviation with respect to the threshold after comparison of reader profiles, the terminal 15 temporarily pauses the payment transaction processes until the merchant has confirmed that the new reader belongs to them. For this, the server 40 contacts the merchant by accessing a merchant profile. The merchant profile includes one or more of: an identifier identifying the merchant (e.g., a name, a number, an alphanumeric identification/code, etc.); contact information associated with the merchant (e.g., a phone number, a mailing address, a physical address, an email address, a fax number, etc.); In this manner, a fraudster cannot swap readers until the merchant has provided authorization and the present subject matter detects a new reader by tracking variation in reader profiles as a new reader either enters, leaves or otherwise moves with respect to the POS terminal 15 thereby presenting a different behavior.

Figure 1B:
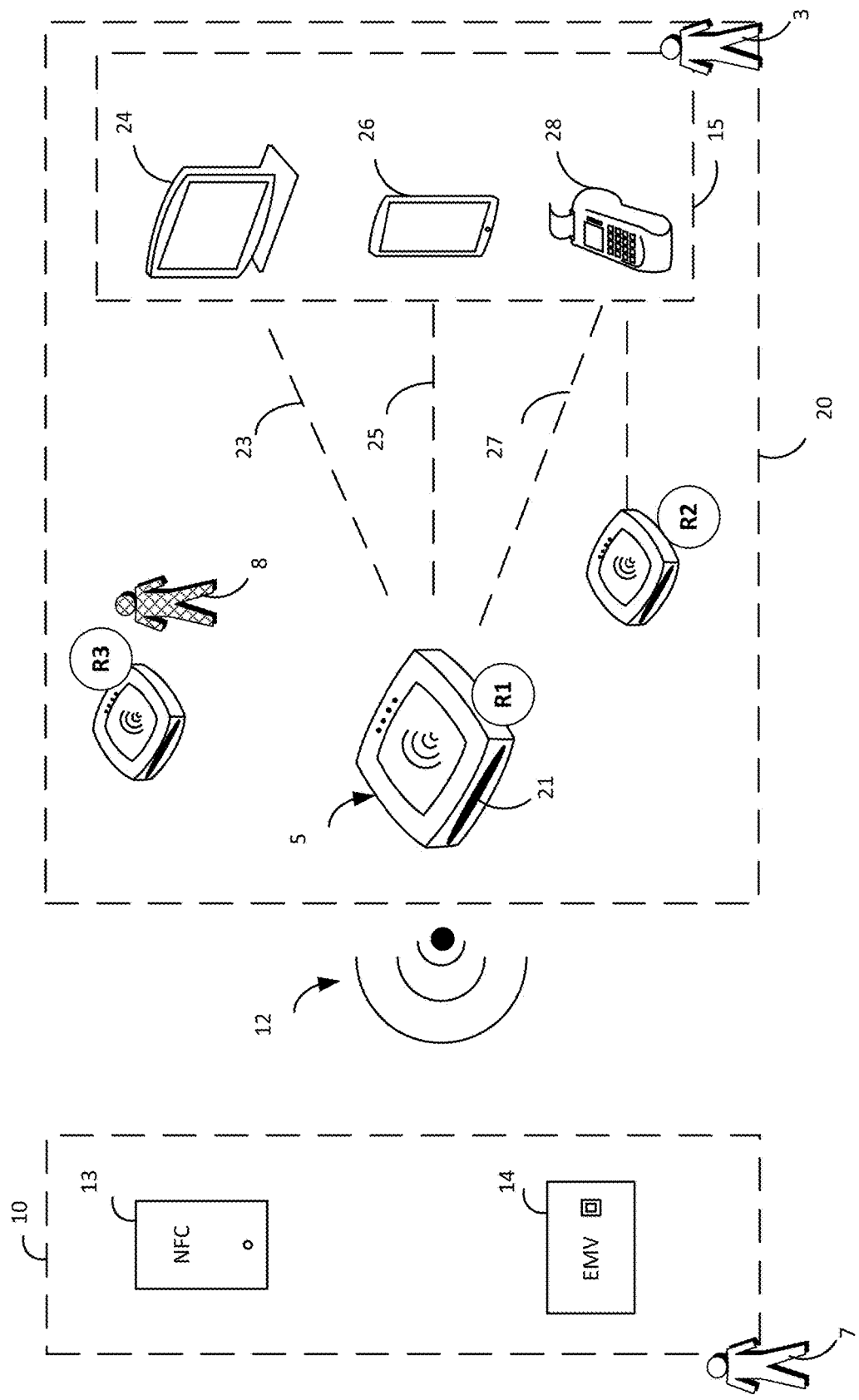
FIG. 1B depicts an illustrative block diagram of a payment reader and payment terminal in accordance with some embodiments of the present disclosure.

FIG. 1B depicts an illustrative block diagram of payment instrument 10 and payment terminal 20 in accordance with some embodiments of the present disclosure. Although it will be understood that payment instrument 10 and payment terminal 20 of payment system 1 may be implemented in any suitable manner, in one embodiment the payment terminal 20 may comprise a payment reader 5 and a POS terminal 15. However, it will be understood that as used herein, the term payment terminal may refer to any suitable component of the payment terminal, such as payment reader 5. In an embodiment, the payment reader 5 of payment terminal 20 may be a wireless communication device that facilitates transactions between the payment instrument 10 and a POS terminal 15 running a point-of-sale application 25.

In one embodiment, payment instrument 10 may be a device that is capable of communicating with payment terminal 20 (e.g., via payment reader 5), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 5 (e.g., in accordance with ISO 7816) and in some embodiments, may be inductively coupled to payment reader 5 via a near field 12. A chip card 14 that is inductively coupled to payment reader 5 may communicate with payment reader 5 using load modulation of a wireless carrier signal that is provided by payment reader 5 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 5). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 5 via near field 12 and may communicate with payment terminal 20 by active or passive load modulation of a wireless carrier signal provided by payment reader 5 in accordance with one or more wireless communication standards such as ISO 14443 and ISO 13092.

Figure 2:
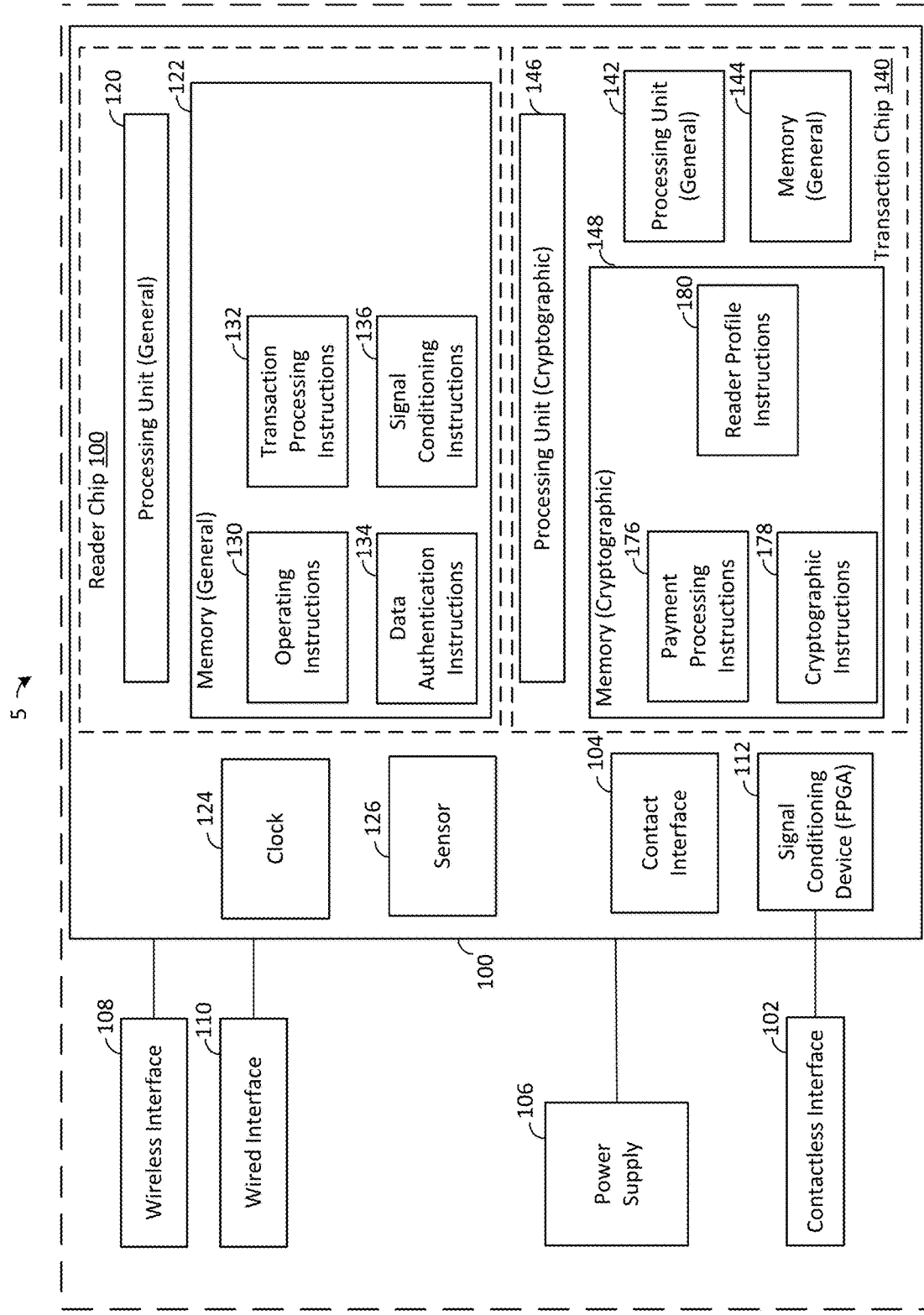
FIG. 2 depicts an illustrative block diagram of a payment reader in accordance with some embodiments of the present disclosure.

Although payment terminal 20 may be implemented in any suitable manner, in one embodiment payment terminal 20 may include a payment reader 5 and a POS terminal 15. The POS terminal 15 runs a point-of-sale application (shown in FIG. 1 as payment application 25) that provides a user interface for the merchant 3 and facilitates communication with the payment reader 5 and the payment server 40. Payment reader 5 may facilitate communications between payment instrument 10 and POS terminal 15. As described herein, a payment instrument 10 such as NFC device 13 or chip card 14 may communicate with payment reader 5 via, for example, inductive coupling. This is depicted in FIG. 2 as near field 12, which comprises a wireless carrier signal having a suitable frequency (e.g., 13.56 MHz) emitted from payment reader 5.

In one embodiment, payment instrument 10 may be a contactless payment instrument such as NFC device 13 or chip card 14, and payment reader 5 and the contactless payment instrument 10 may communicate by modulating the wireless carrier signal within near field 12. In order to communicate information to payment instrument 10, payment reader 5 changes the amplitude and/or phase of the wireless carrier signal based on data to be transmitted from payment reader 5, resulting in a wireless data signal that is transmitted to the payment instrument. This signal is transmitted by an antenna of payment reader 5 that is tuned to transmit at 13.56 MHz, and if the payment instrument 10 also has a suitably tuned antenna within the range of the near field 12 (e.g., about 0 to 10 cm), the payment instrument receives the wireless carrier signal or wireless data signal that is transmitted by payment reader 5. In the case of a wireless data signal, processing circuitry of the payment instrument 10 is able to demodulate the received signal and process the data that is received from payment reader 5.

When a contactless payment instrument such as payment instrument 10 is within the range of the near field 12, it is inductively coupled to the payment reader 5. Thus, the payment instrument 10 is also capable of modulating the wireless carrier signal via active or passive load modulation. By changing the tuning characteristics of the antenna of payment instrument 10 (e.g. by selectively switching a parallel load into the antenna circuit based on modulated data to be transmitted) the wireless carrier signal is modified at both the payment instrument 10 and payment reader 5, resulting in a modulated wireless carrier signal. In this manner, the payment instrument is capable of sending modulated data to payment reader 5. Furthermore, the payment reader 5 and the POS terminal 15 interact through one or more communication ports and via communication protocols to exchange and generate a reader profile based on behavior, such as motion tracking, of the reader 5 with respect to the POS terminal 15. Such reader profiles are associated with the payment application 25 executing on the POS terminal 15.

In some embodiments, payment reader 5 also includes an EMV slot 21 that is capable of receiving chip card 14. Chip card 14 may have contacts that engage with corresponding contacts of payment reader 5 when chip card 14 is inserted into EMV slot 21. Payment reader 5 provides power to an EMV chip of chip card 14 through these contacts and payment reader 5 and chip card 14 communicate through a communication path established by the contacts.

Payment reader 5 may also include hardware for interfacing with a magnetic strip card (not depicted in FIG. 2). In some embodiments, the hardware may include a slot that guides a customer 7 to swipe or dip the magnetized strip of the magnetic strip card such that a magnetic strip reader can receive payment information from the magnetic strip card. The received payment information is then processed by the payment reader 5.

POS terminal 15 may be any suitable device such as tablet payment instrument 24, mobile payment instrument 26, or payment terminal 28. In the case of a computing device such as tablet payment instrument 24 or mobile payment instrument 26, a point-of-sale application may provide for the entry of purchase and payment information, interaction with a customer 7, and communications with a payment server 40. For example, a payment application may provide a menu of services that a merchant 3 is able to select and a series of menus or screens for automating a transaction. A payment application may also facilitate the entry of customer authentication information such as signatures, PIN numbers, or biometric information. Similar functionality may also be provided on a dedicated payment terminal 28.

POS terminal 15 may be in communication with payment reader 5 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 5 may communicate with the POS terminal 15 via a Bluetooth low energy (BLE) interface, such that the payment reader 5 and the POS terminal 15 are connected devices. In some embodiments processing of the payment transaction may occur locally on payment reader 5 and POS terminal 15, for example, when a transaction amount is small or there is no connectivity to the payment server 40. In other embodiments, POS terminal 15 or payment reader 5 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

According to one implementation, a fraudster 8 walks into the merchant location, defined by the boundaries of the payment system 20, with an intention to swap the legitimate reader R1 (or R2) with their reader R3 to charge the customer with a fraudulent amount while charging a right sale amount to their card thus giving the merchant and customer the impression that a proper sale has been consummated. It will be understood that the boundaries may be wider, narrower or otherwise different from the payment system 20. However, as described in the present subject matter, a new reader such as reader R3 triggers the POS terminal 15 or the payment system 20 to review the state via the reader profile. In another example, movement or rearrangement of R1 or R2 triggers the reader profile to change above or below a certain threshold. The presence of the new reader R2 triggers a new reader profile, which is different from the original reader profile. As such, the payment server 40 or the POS terminal 15 sends notification to this effect indicating the merchant 3 that a new reader has either entered or an existing reader has exited the territory thus exhibiting deviation from an established and stored reader behavior. The merchant 3 can then re-evaluate the state of readers R1 (and in some cases R2) to determine the position of readers with respect to the POS terminal 15 and halt transactions until a resolution has reached.

Figure 3:
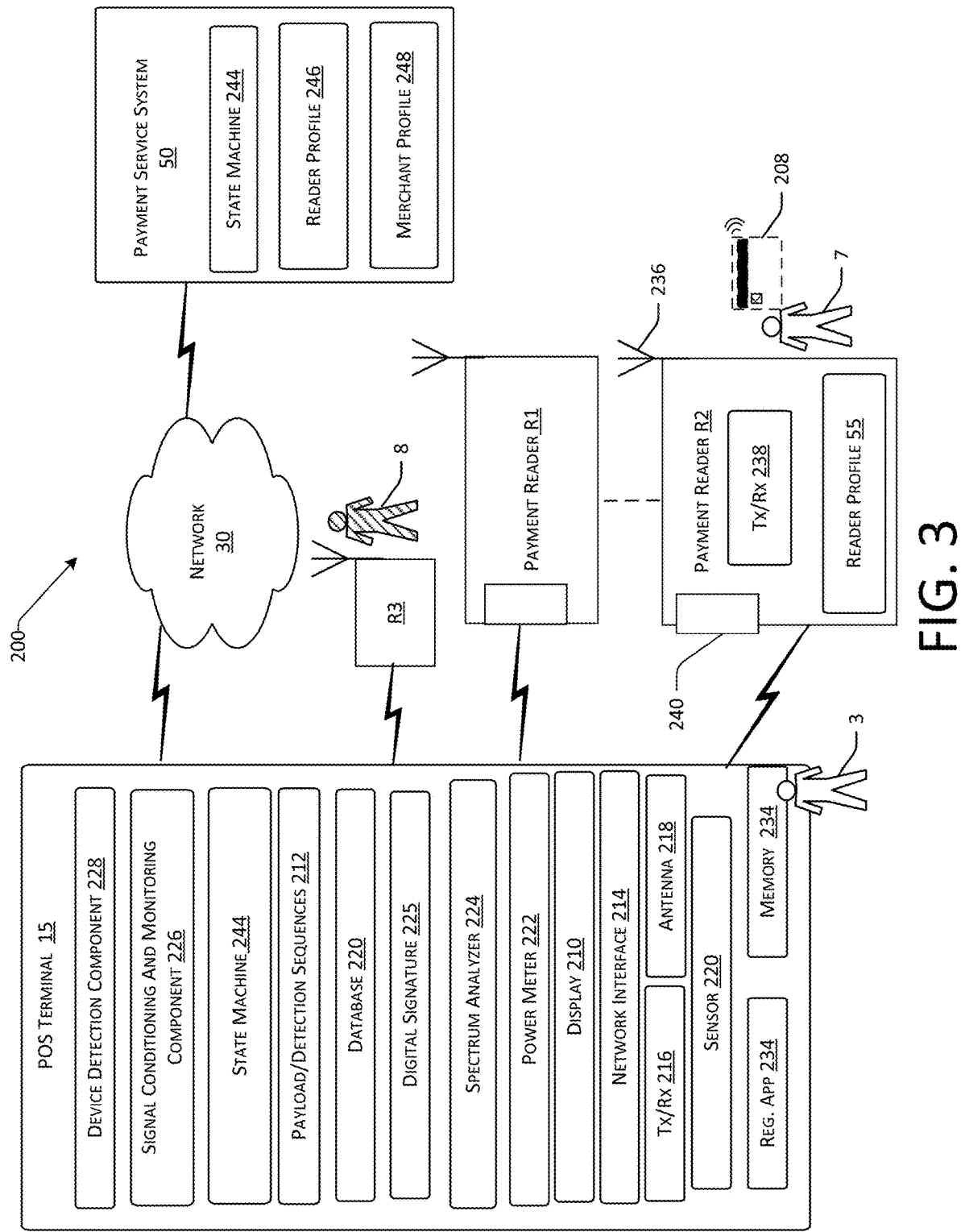
FIG. 3 depicts an illustrative block diagram of a POS terminal interacting with a payment reader and a payment server in accordance with some embodiments of the present disclosure.

FIG. 3 depicts a block diagram of an exemplary payment reader 5 in accordance with some embodiments of the present disclosure. In one embodiment, payment reader 5 may be a wireless communication device that communicates wirelessly with an interactive electronic device such as a POS terminal 15, for example, using BLE. Although particular components are depicted in a particular arrangement in FIG. 3, it will be understood that payment reader 5 may include additional components, one or more of the components depicted in FIG. 3 may not be included in payment reader 5, and the components of payment reader 5 may be rearranged in any suitable manner. In one embodiment, payment reader 5 includes a reader chip 100, a plurality of payment interfaces (e.g., a contactless interface 102 and a contact interface 104), a power supply 106, a wireless communication interface 108, a wired interface 110, a user interface 112, and a transaction chip 140. Reader chip 100 of payment reader 5 includes a processing unit 120 and memory 122. Transaction chip 140 of payment reader 5 includes a general processing unit 142, cryptographic processing unit 146, general memory 144, and cryptographic memory 148. Although in one embodiment the processing units and memories will be described as packaged in a reader chip 100 and transaction chip 140 respectively, and configured in a particular manner, it will be understood that processing unit 120, general processing unit 142, cryptographic processing unit 146, memory 122, general memory 144, and cryptographic memory 148 may be configured in any suitable manner to perform the functionality of the payment reader 5 as is described herein. It will also be understood that the functionality of reader chip 100 and transaction chip 140 may be embodied in a single chip or a plurality of chips, each including any suitable combination of processing units and memory to collectively perform the functionalities of reader chip 100 and transaction chip 140 as described herein.

In some embodiments, reader chip 100 may be any suitable chip, such as a K21 chip supplied by Freescale Semiconductor, Inc. Processing unit 120 of reader chip 100 of payment reader 5 may be any suitable processor and may include any suitable hardware, software, memory, and circuitry as is necessary to perform and control the functions of payment reader 5. Processing unit 120 may include any suitable number of processors, and may perform the operations of reader chip 100 based on instructions in any suitable number of memories and memory types. In some embodiments, processing unit 120 may have multiple independent processing units, for example a multi-core processor or other suitable component. Processing unit 120 may execute instructions stored in memory 122 of reader chip 100 to control the operations and processing of payment reader 5. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may operate as a hub for controlling operations of the various components of payment reader 5, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108, circuitry for interfacing with a wired interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Transaction chip 140 may include one or more processors having processing capability necessary to perform the processing functions described herein, including but not limited to hardware logic, computer readable instructions running on a processor, or any suitable combination thereof. In an exemplary embodiment, transaction chip 140 may include two RISC processors and may perform functionality relating to processing of payment transactions, interfacing with payment instruments, cryptography, and other payment-specific functionality. In some embodiments, transaction chip 140 may include a general processing unit 142 for executing instructions associated with general payment functionality and a cryptographic processing unit 146 for handling cryptographic processing operations. Each of general processing unit 142 and cryptographic processing unit 146 may have dedicated memory associated therewith (i.e., general memory 144 and cryptographic memory 148). In this manner, specific cryptographic processing and critical security information (e.g., cryptographic keys, passwords, user information, etc.), may be isolated from other circuitry of transaction chip 140 and securely stored and processed by cryptographic processing unit 146 and stored at cryptographic memory 148.

One or both of general processing unit 142 and cryptographic processing unit 146 of transaction chip 140 may communicate with reader chip 100 (e.g., processing unit 120), for example, using any suitable internal bus and communication technique. In this manner, reader chip 100 and transaction chip 140 can collectively process transactions and communicate information regarding processed transactions (e.g., with POS terminal 15).

Transaction chip 140 may also include circuitry for interfacing with a contact interface 104 (e.g., power and communication circuitry for directly interfacing with an EMV chip of a chip card 14 that is inserted in slot 21). In some embodiments, transaction chip 140 may also include analog front-end circuitry for interfacing with the analog components of contactless interface 102 (e.g., electromagnetic compatibility (EMC) circuitry, matching circuits, modulation circuitry, and measurement circuitry).

In some embodiments, general processing unit 142 may include any suitable processor for performing the payment processing functionality of payment reader 5 described herein. In some embodiments, general memory 144 may be any suitable memory (e.g., as described herein), and may include a plurality of sets of instructions for performing general transaction processing operations of payment reader 5, such as transaction processing instructions, data authentication instructions, and signal conditioning instructions, any of which may be implemented entirely or partially in firmware stored at memory 144.

Transaction processing instructions may include instructions for controlling any suitable general transaction processing operations of the payment reader 5, such as controlling the interaction between the payment reader 5 and a payment instrument 10 (e.g., for interfacing with a payment instrument 10 via the contactless interface 102 and contact interface 104), selecting payment processing procedures (e.g., based on a payment processing entity associated with a payment method), interfacing with the cryptographic processor 146, and any other suitable aspects of transaction processing. Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific). Signal conditioning instructions 136 may include instructions for interacting with a contactless interface and signal conditioning circuitry for the contactless interface, including instructions for conditioning signals received from a payment instrument 10 via the contactless interface 102 (e.g., from a NFC payment instrument 10). Signal conditioning instructions 136 may include instructions for conditioning signals using any suitable hardware, logic, or algorithm required to process NFC signals received via contactless interface 102.

Cryptographic processing unit 146 may be any suitable a processor as described herein, and, in some embodiments, may perform cryptographic functions for the processing of payment transactions. For example, in some embodiments a cryptographic processing unit 146 may encrypt and decrypt data based on one or more encryption keys, in a manner that isolates the encryption functionality from other components of payment reader 5 and protects the encryption keys from being exposed to other components of payment reader 5.

In some embodiments, cryptographic memory 128 may be any suitable memory or combination thereof as described herein, and may include a plurality of sets of instructions for performing cryptographic operations, such as payment processing instructions and cryptographic instructions. Payment processing instructions may include instructions for performing aspects of payment processing, such as providing for encryption techniques to be used in association with particular payment procedures, accessing account and processing information, any other suitable payment processing functionality, or any suitable combination thereof. Cryptographic instructions may include instructions for performing cryptographic operations. Cryptographic processing unit 146 may execute the cryptographic instructions to perform a variety of cryptographic functions, such as to encrypt, decrypt, sign, or verify a signature upon payment and transaction information as part of a payment transaction. In some embodiments, cryptographic memory 148 may be any suitable memory (e.g., as described herein), and may include a plurality of sets of instructions for performing operations of payment reader 5, such as reader profile instructions 180, any of which may be implemented entirely or partially in firmware stored at memory 148.

The reader profile instructions 180 may include instructions for communicating with the payment terminal 20 and payment server 40 to provide information related to characteristics, such as location, signal strength, power levels, radiation levels, and the like, to the payment terminal 20 and server 40. The reader profile instructions 180, in some implementations, can also be received as payload/detection sequences from the terminal 20 or server 40 either randomly or at predefined time intervals. The execution of the reader profile instructions 180 causes collection of reader characteristics, including behavioral characteristics such as geographic locations where the merchant carries the reader, the reader that the merchant uses to sell categories of items, the time of day the readers are active, the average amount spent by the buyers in certain merchant categories, the average time the merchant spends in interacting with the reader, and so forth. The configuration information may include any suitable information, such as payment limits and types of transactions for local transactions (i.e., transactions that occur without contacting a payment server 40) and supported applications.

Wireless communication interface 108 may include any suitable wireless communications hardware (e.g., antennas, matching circuitry, etc.) and one or more processors having processing capability necessary to engage in wireless communication (e.g., with a POS terminal 15 via a protocol such as BLE) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit 130 and memory 132. Although in one embodiment, the processing unit 130 and memory 132 will be described as packaged in a wireless communication interface 108 and configured in a particular manner, it will be understood that processing unit 130 and memory 132 may be configured in any suitable manner to perform the functionality of the wireless communication interface 108 as is described herein.

Processing unit 130 may include any suitable processor or processing hardware for performing the functionality of wireless interface 108 as described herein. In some embodiment, processing unit 130 may execute the instructions of memory 132 to interact with and control hardware and other components of the wireless communication interface 108 in order to transmit and receive wireless communications (e.g., via BLE) and to communicate with other circuitry (e.g., processing unit 120 of reader chip 100) of payment reader 5 (e.g., using an internal bus or any other suitable communication method). Memory 132 is memory, as described herein, and may include wireless instructions for performing the processing operations of wireless communication interface 108. In some embodiments, memory 132 may be implemented as static random-access memory (SRAM), but any suitable memory format may be used to carry out the functionality of payment reader 5 as described herein. Wireless instructions 132 may include instructions for interacting with processing unit 120 of reader chip 100, in order to perform functions such as sending and receiving messages, configuring aspects of a BLE connection, and controlling bonding and pairing of wireless communication interface 108 to other devices (e.g., to POS terminal 15 using BLE).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 13092. When the payment reader 5 is inductively coupled to a contactless device, the contactless device may also modulate the carrier signal, which may be sensed by the contactless interface 102 and provided to the reader chip 100 for processing. Based on these modulations of the carrier signal, payment reader 5 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

Power supply 106 may include one or more power supplies such as a physical connection to AC power or a battery. Power supply 106 may include power conversion circuitry for converting AC power and generating a plurality of DC voltages for use by components of payment reader 5. When power supply 106 includes a battery, the battery may be charged via a physical power connection, via inductive charging, or via any other suitable method. Although not depicted as physically connected to the other components of the payment reader 5 in FIG. 3, power supply 106 may supply a variety of voltages to the components of the payment reader 5 in accordance with the requirements of those components.

Wired interface 110 may include any suitable interface for wired communication with other devices or a communication network, such as USB, Lightning, FireWire, Ethernet, any other suitable wired communication interface, or any combination thereof. In some embodiments, wired interface 110 may allow payment reader to communicate with one or both of POS terminal 15 and payment server 40.

User interface 112 may include any suitable user interface (e.g., buttons, touchscreen, keyboard, voice recognition, biometric readers, etc.) that allow a user to directly interact with a payment reader 5. In some embodiments, many of the user interface interactions with a payment reader 5 may be accomplished by a point-of-sale application running on a POS terminal 15, and may be communicated via either wireless interface 108 or wired interface 110. User interface 112 may be a simple interface, such as a single button or limited set of buttons. Different types or sequences of button presses (e.g., holding a button down for more than a threshold time, particular sequences of button presses, etc.) may implement different functionality at the payment reader 5.

Memory 122 of reader chip 100 may include a plurality of sets of instructions for controlling operations of payment reader 5, such as operating instructions 130, transaction processing instructions 132, data authentication instructions 134 and signal conditioning instructions 136.

Operating instructions 124 may include instructions for controlling any suitable general operations of the payment reader 5, such as internal communications, power management, processing of messages, system monitoring, sleep modes, user interface response and control, operation of the wireless interface 108, operation of the transaction chip 140, and the management of the other sets of instructions. In one embodiment, the operating instructions 130 may provide the operating system and applications necessary to perform most of the processing operations that are performed by the processing unit 120 of the reader chip 100 of payment reader 5.

Operating instructions 130 may also include instructions for interacting with a POS terminal 15. In one embodiment, the POS terminal 15 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 5 (e.g., via wireless interface 108). The operating instructions 130 facilitate processing of the payment, for example, by acquiring payment information via the contactless interface 102 or contact interface 104, invoking the transaction chip 140 to process that payment information, and by generating responsive messages that are transmitted to the point-of-sale application of the POS terminal via wireless interface 108.

Operating instructions 130 may also include instructions for interacting with a payment server 40. In one embodiment, a payment server 40 may be associated with the payment reader 5 and the point-of-sale application of the POS terminal 15. For example, the payment server 40 may have information about payment readers 22 and POS terminals 15 that are registered with the payment server 40 (e.g., based on unique identifiers). This information may be used to process transactions with servers of the merchant and customer financial institutions, for providing analysis and reports to a merchant, and aggregating transaction data. The payment reader 5 may process payment information (e.g., based on operation of reader chip 100 and transaction chip 140) and communicate that processed payment information to the point-of-sale application, which in turn communicates with the payment server 40. In this manner, messages from the payment reader 5 may be forwarded to the payment server 40, such that the payment reader 5 and payment server 40 may collectively process the payment transaction.

Transaction processing instructions 132 may include instructions for processing payment transactions at payment reader 5. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment instrument, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with transaction chip to perform most transaction processing operations.

Wireless instructions 128 may include instructions for configuring a wireless interface, managing wireless pairing/bonding, optimizing throughput of the wireless connection, engaging in wireless communications, and controlling any other suitable functionality relating to the operation of a wireless interface of the payment reader (e.g., wireless interface 108). Although wireless instructions may operate in conjunction with any suitable wireless interface 108, in an exemplary embodiment the wireless interface 108 may be a BLE interface.

In some embodiments, wireless instructions 128 may include instructions for configuring wireless interface 108. In some embodiments, processing unit 120 of reader chip 100 may execute wireless instructions 128 to exchange messages in order to communicate with wireless interface 108 to configure the wireless interface 108 for operation. Any suitable parameters may be configured based on the wireless instructions, such as settings related to pairing/bonding (e.g., General Access Profile (GAP) settings, advertising modes, discovery modes, available roles, and white lists) and connections (e.g., General Attribute Protocol (GATT) settings, connection intervals, and maximum transmission units).

In some embodiments, wireless instructions 136 may include instructions for managing wireless pairing/bonding between wireless interface 108 and a wireless interface of the POS terminal 15. In some embodiments, wireless instructions may enforce a structured procedure for establishing, maintaining, and modifying connections between payment reader 5 and POS terminal 15. Although any suitable structured procedure may be implemented by wireless instructions 128, in some embodiments an exclusive connection may be established between payment reader 5 and a single POS terminal 15. Procedures may also be established for payment reader 5 to enter states where it may advertise for possible exclusive bonds with other POS terminals 29, for example, based on a user input.

In some embodiments, wireless instructions 136 may include optimizing throughput of a wireless connection between the wireless interface 108 of the payment reader 5 and a wireless interface of the POS terminal 15. In some embodiments, payment reader 5 may modify certain parameters of a particular BLE connection with a POS terminal 15 in order to optimize the connection (e.g., for a desired throughput, etc.). The payment reader 5 may set the parameters itself, and in some embodiments, may communicate with POS terminal 15 to receive a request to modify the parameters. For example, in some embodiments, the processing unit 120 of reader chip 100 of payment reader 5 may have low-level access to commands that are exchanged with wireless interface 108, such that payment reader 5 may modify numerous parameters that cannot be modified by a point-of-sale application running on a POS terminal 15, which may only be able to modify a limited subset of parameters or provide high-level commands (e.g., through a required API for the BLE interface of the POS terminal 15). In an embodiment, if a point-of-sale application operating on a POS terminal 15 desires to monitor or modify lower-level parameters of the BLE connection (e.g., maximum transmission units and connection intervals) it may communicate with the payment reader 5 to acquire the desired information or modify the lower level parameter.

In some embodiments, wireless instructions 136 may include instructions for engaging in wireless communications between a processing unit of payment reader 5 (e.g., processing unit 120) and processing of the POS terminal 15, via the wireless interface 108 of the payment reader 5 and a wireless interface of the POS terminal 15. During an active BLE connection, data packets may be exchanged via one or more BLE characteristics, with data packets able to be sent in modes such as an acknowledged and unacknowledged mode. In an unacknowledged mode, additional packets may be transmitted immediately after the unacknowledged message was sent (i.e., an unreliable message). In an acknowledged mode, additional packets may not be sent until the acknowledgement packet has been acknowledged by the other BLE device (a reliable connection), which occurs during a later connection event between the two devices. In some embodiments, processing unit 120 of reader chip 100 may execute wireless instructions 128 in order to selectively control the selection of acknowledgement packets and unacknowledged packets, for example, based on the type of information being transmitted.

In some embodiments, the payment reader 5 and the POS terminal 15 may combine acknowledgement packets and unacknowledged packets in a manner to provide a high-throughput reliable connection. For example, a plurality of data portions may be transmitted using a plurality of unacknowledged packets. A packet identifier may be included within each of the unacknowledged packets. During a single connection event, the device transmitting the data may send multiple unacknowledged packets (each including a data portion and a packet identifier) and the final packet of the connection event may be an acknowledgement packet. The device receiving the packets during the connection event (multiple unacknowledged packets and a final acknowledged packet) may respond to the acknowledgement packet during the next connection event with packet identifiers for all of the received unacknowledged packets. If the packet identifiers associated with all of the unacknowledged packets are received, the original sending device may send the next data portions during the next connection event. If not all of the packet identifiers are received, the missing unacknowledged packet may be resent (e.g., alone, or with additional packets) during the next connection event.

The data authentication instructions 134 include instructions to generate, provide or otherwise modify the reader profile associated with the reader 5. The reader profile varies as the reader moves from a first location to a second location. The reader profile can be modified either by a POS terminal 15 or by itself.

The reader 5 also includes sensor 126 such as a magnetometer, an accelerometer, transmitter/receiver of an antenna sub-system, camera, a GPS unit, a spectrum analyzer, a gyrometer, and the like. The sensor may be based upon any later-developed or convention sensor technology, such as CMOS, CCD, or the like. Image recognition components may be provided to process the image data. For example, such components can support functionalities including, but not limited to, location tracking, location detection, device fingerprinting, barcode detection, facial recognition, camera parameter control, etc.

FIG. 3 is an exemplary system 200 illustrating systems and methods to track readers R1 and R2 and an unknown reader or reader R3 belonging to a fraudulent user, in association with a payment application executing on a POS terminal 15, to generate a reader profile based on behavior of the readers, and to pause transactional activity after detecting a change in reader profile in a subsequent transaction either at the same or a different merchant location, according to an implementation of the present subject matter.

Although a POS terminal 15 may be implemented in any suitable manner, in one embodiment the POS terminal 15 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein. Although particular components are depicted in a particular arrangement in FIG. 3, it will be understood that POS terminal 15 may include additional components, one or more of the components depicted in FIG. 4 may not be included in POS terminal 15, and the components of POS terminal 15 may be rearranged in any suitable manner.

In one implementation, the POS terminal 15 includes one or more components configured specifically to allow the merchant to associate readers, such as R1 and R2, with the terminal 15 and track reader characteristics (including R3's) and behavior over time as fraud detection and payment authentication tools. The components include, for example, a display 210, a database 212, a network interface 214, a transmitter-receiver 216, an antenna 218, a sensor 220 (such as an accelerometer, gyrometer, magnetometer, etc.), a power meter 222, and a spectrum analyzer 224. As shown, the POS terminal 15 also includes a signal conditioning and monitoring component 226, a device detection component 228, a state machine 244, and payload or detection sequences 232, and a registration application 234, all of which may be within a memory 250 even though memory 250 is shown as a separate component. In some implementations, a cryptographic memory (not shown) includes the components above. In one implementation, these components can be part of a POS terminal, such as POS terminal 15, connected to the payment reader 5, such as reader R1 and R2, but not connected to reader R3 or fraudulently connected to R3 after a fraudulent attack. The readers may each include sensors 238, such as GPS units, antenna 236 and transmitter-receiver, accelerometers, and communication ports 240. The communication ports 240 shown can be either hardware or software implementations. The POS terminal 15 and readers 5 interact with each other through available communication ports 240. The reader R1/R2 interacts with the POS terminal 15 through the communication ports 240 and a reader profile 55 is generated. The reads include other components (labeled only in reader R2 for clarity), for example as shown in FIG. 2. The reader profile includes reader characteristics include but are not limited to: detection of location based on change in timing parameters, radiated performance, wireless performance, quality of communication links, radio frequency response, transmission measurements, receiver measurements, location values, and engineering tolerances.

In one implementation, the device detection component 228 is configured to detect and track movement of devices, such as readers, through change in reader characteristics, such as location or mechanical and operational differences. The network interface 214 includes various communication protocol interfaces available to the POS terminal 15 with which it can interact with other wireless devices, e.g., readers R1 and R2 or even R3. The device detection component 228 is also configured to generate a behavioral profile of the reader or readers associated with a payment application, for example in response to a received device characteristic over time, and then register the reader with a payment processor, such as payment service system (not shown) for detection during a future use. The reader profile 246 also includes the mapping of the reader with a payment application and is sent to the PSS coupled to the payment object reader. Device identification processes can also be accomplished locally in isolation at the payment object reader level without interaction or communication with external devices (e.g., RFID tag readers and POS devices or other wireless network access points). This isolation reduces the risk of electronic pick pocketing of device information that can occur when payment devices are continually in wireless communication with external devices.

To use a device or devices as authorized readers, the POS terminal may first register the devices as such, when a merchant performs a first transaction or first makes the connection between the reader and the terminal. The state machine 244 then tracks the behavior of reader with respect to the terminal over time to create reader profiles.

Now assume that a fraudulent user walks into a store, approaches the registered reader or terminal and either swaps the reader with their own reader unbeknownst to the merchant or spoofs a merchant application. As per present disclosure, the state machine is constantly scanning the environment for deviation in behavior. If the deviation exceeds a threshold or confidence score, the merchant is alerted via a communication identifier provided at the time of account set up. As part of the scan and detection by state machine, the behavior may vary because of entry of an unknown device within the merchant's geo-fence, movement of a registered reader which is otherwise known to be stationary and vice versa, dropping connection with a reader that was previously connected, movement of a reader in a territory that is unlike previous behavior, two readers taking payments at about the same time for about the same amount or more than a threshold amount via the same merchant application, presence of two payment applications at the same location, two purchases being made at the same time, and other such behaviors. The POS terminal 15 uses radio communication techniques or other location detection techniques (triangulation, for example) to measure, for example, signal strength from the devices within the geo-fence to determine which device is the closest, farthest, any detect other behaviors mentioned above.

As mentioned, the behaviors including the reader-terminal-merchant relationship, also referred to as the reader profile or store signature, can be stored in a central payment service system, such as PSS 50, or locally within, for example, a secure enclave system, such as database 220, in the POS terminal 15. Similar to the POS terminal, the PSS 242 may include the state machine 244, the reader profile 246 as received from the POS terminal 15, and a merchant profile 248, which is a database of all merchant data and connections of readers to merchants.

In one implementation, the POS terminal 15 sends a request to the neighboring devices, which are detected by a geographical or logical fence of the POS terminal 15, or to the closest device. So, the POS terminal 15 may send a request to all devices within the geo-fence or specific devices determined to be closest to the buyer 202. Assume that the POS terminal 15 sends requests to readers R1, R2, and R3.

In one implementation, a merchant launches or opens a registration application or a mobile payment portal 234 (e.g., a payment application installed on the device or a web application in web browser) executing on a mobile device, e.g., a phone or a laptop, or the POS terminal 15 to initiate registration of the readers and any other devices that the buyer would like to register, for example reader R3. The term "registration application" or "mobile payment portal" as used here, refers to any registration application that enables communication between users (e.g., sender and recipient of a message) over a wired or wireless communications network. The registration application 234 can be employed by a service provider that delivers a communication service to users, e.g., chat capability or capability to enter payment information, say through a form. The registration application 234 may include one or more components and/or engines, or a component and/or engine can include one or more applications. The registration application 234 can include, for example, a mobile payment application, a text messaging application for communication between phones (e.g., conventional mobile telephones or smartphones), or a cross-platform instant messaging application for smartphones and phones that use the Internet for communication.

The registration application 234 can also include, for example, a web browser application accessible via a uniform resource locator (URL). In some embodiments, the URL is identified by a graphical user interface (GUI) of a mobile payment application installed on the terminal 15.

The registration application 234 facilitates collection of and connection between the reader's behavior and characteristics as profile 246. For example, the registration application 234 requests the merchant 3 to confirm the reader R1 or R2 belongs to them and enter a code for further confirmation. This step may be performed only at the time of registration. Once confirmation is received, the POS terminal 15 executes a control logic to determine which techniques, protocols, parameters, test sequences, components, etc., should it implement to register the device.

At the time of both detection and validation of the device fingerprint for authentication, it may be useful to have data corresponding to all possible parameters, protocols and test sequences, however the reader may not be prepared or available for all kinds of communication. To communicate with the reader, the device detection component 228 determines whether the corresponding communication ports in the reader are available or accessible and/or appropriate software permissions have been obtained to make the communication. To this end, the device detection component 228 through the network interface 214 determines which communication ports 240 of the reader are accessible, and accordingly its own ports to establish communication links with the available port. Alternatively, the POS terminal 15 may send requests to activate certain ports 240 to allow seamless communication and further registration process. The buyer's device may respond with an automatic or user-initiated activation of the ports 240, e.g., by activating NFC, Wi-Fi, or Bluetooth communication.

Then the device detection component 228 establishes communication links with all or a selected number of available ports 240 using the appropriate communication protocol and the merchant 3 may be notified when the terminal 15 makes such connections. For example, the device detection component 228 queries the reader in response to a deviation in behavior of movement from a known location A to a new location B. Specifically, the terminal 15 applies the device detection component 228 to measure the performance of the microphone, accelerometer, gyrometer, magnetometer, antenna transmitter and receiver, or any such sensor of the device 202-1. The device detection component 228 may also implement logic to interact with the hardware and software components of the device 202-1 to measure the tiniest behavioral differences in the reader and record them as deviations to compare to the reader profile.

The device detection component 228 also activates the antenna 218 and receiver-transmitter 216, spectrum analyzer 224, sensor 220, and the like of the terminal 15 to communicate with a corresponding antenna and transmitter-receiver of the device 202-1 through the radio communication protocol. The device detection component 228 detects parameters, either individually or in combination, rise-time signatures, spectral values, signal transients, hardware impairments, channel characteristics, power values, signal strength, identity of the received signals, say in terms of frequency or phase, timing parameters associated with the received signal, and the like, to obtain physical characteristics of the reader and store them as reader profile.

The device detection component 228 may also accompany request for information with specific sequences or payload 212, which it generates or modifies based on the available communication ports 240. The payload 212 may either be common between all devices being registered or unique for each device. The payload 212 can be a data signal or a series of instructions that trigger the reader or certain components, like the transmitter or sensors, to respond. The nature of responses from the reader or the content therein is said to be unique for each device and is saved as reader profile or at the time of detection, as response to compute deviation from. The responses from the selected devices can also be in the form of affirmative or negative answers to queries from the POS terminal 15. The responses, whether binary or textual information, can be conditioned. The signal conditioning and monitoring component 226 performs such conditioning required to remove noise or to change data format, in select cases.

The device detection component 228 may provide the functionality for determining whether a reader is an outlier and for notifying merchants when an outlier is determined. For example, the device detection component 228 may determine a fraud score for a reader based comparison with the reader profiles. The component 228 may determine whether to associate the reader with fraudulent activity based on the fraud score. Furthermore, the device detection component 228 may notify one or more merchants when a reader associated with the one or more payment application or merchants has been associated with fraudulent activity. The device detection component 228 can also determine identity of merchant associated with the fraudulent reader and determine whether that reader has deviated from its reader profile as well. The merchant information associated with the reader can be used to determine identity of the fraudster. In some cases, the device detection component 228 also tags the legitimate readers with a non-zero fraud score even if the readers were present at the time of a fraudulent activity. This information can be used to detect which merchant locations are more likely to be attacked. Accordingly, merchants can use this information to implement additional security measures to prevent swapping of readers, etc.

The device detection component 228 obtains the device fingerprints 246 and saves the values either locally or in a persistent remote location, such as PSS 242. The device detection component 228 also stores the relationship between the reader fingerprints and the payment object presented at the time of transaction as device-object relationships, for example in registered device fingerprints 248. For this step, the buyer may be asked to enter an authorization code to confirm for the first time that the card in fact belongs to him. The terminal 15 stores identifier of the reader, such as IMEI number or even behavioral characteristics. The device detection component 228 saves such relationships in a database 212 embedded in or associated with the terminal 15. Additionally, or alternatively, the device detection component 228 applies a cryptographic algorithm, for example encryption or tokenization, to the received relationships prior to storage.

This completes the registration of the device as an authentication tool for any subsequent payment transactions. By setting up the relationships, the terminal 15 allows that every time a user presents the payment object, like a credit card, with the device 202-1, the transaction is authenticated as being safe. Conversely, if the user presents another object in the presence of the device 202-1, the user may be asked if they would like to try another card. In other cases, it may be determined if the new card is associated with a different device. If yes, the transaction may be rejected as a fraudulent attempt. In another scenario, the user may present the card but not have the registered device on him, in which case, he may have to authorize in the conventional manner.

Thus, once saved in the database 212, the registered device fingerprints or the device-object relationships can be retrieved and used as valid authentication tools for payment instruments at the time of a payment transaction, for example through the point of sale terminal. Now, the process of authorization using a registered device fingerprint is described. At the time of transaction, when the buyer 202, on arrival at the point of payment, wishes to use his device as a means of authorization of the payment object to purchase a product, the buyer 202 first makes such selections using the mobile payment portal. Then the buyer 202 presents the payment object that was present at the time of registration at the merchant's location where the POS terminal 15 is installed.

In some implementations, the device detection component 228 captures the device fingerprints, for example, at least one of the radio fingerprints, the manufacturing tolerances, and the like, in a manner similar to the process of registration. So, the device detection component 15 first seeks permission from the proximate devices 202-1 and 204-2 and determines available open ports. Subsequently, device detection component 228 generates a payload, which may be similar to the payload used at the time of registration, and waits for a response from the devices 202-1 and 204-1. In this manner, the device detection component 15 captures a digital device fingerprint of the devices 202-1 and 204-1 present at the merchant location. The device detection component 228 can implement a tokenization technique, similar to the one used at the time of device registration, to generate another digital signature 225 or representation of the imprint in response to the captured device fingerprints and the payment object presented at the merchant's location.

In one implementation, the terminal 15 sends the current state to the payment service system 242 via the communication network 30 for comparison with reader profile 246, that includes behaviors and previous states of readers connected to the merchant account. The device detection component 228 can also fetch the registered reader profile from a local storage unit, as the case may be. The device detection component 228 subsequently verifies reader identity based on the comparison. For example, the payment service system 242 compares previously stored reader profiles or fingerprints of the devices registered by the merchant or profile obtained at the POS terminal 15 through the state machine 244. If the state does not match with a reader profile, which means there is a deviation in behavior, the POS terminal 15 generates a notification for the merchant to authenticate the new reader by providing an authorization code. Once authenticated, the reader is added to the merchant list of authorized readers and payment transaction is fulfilled through the issuer, acquirer and card processing network, as described in FIG. 1.

Figure 4:
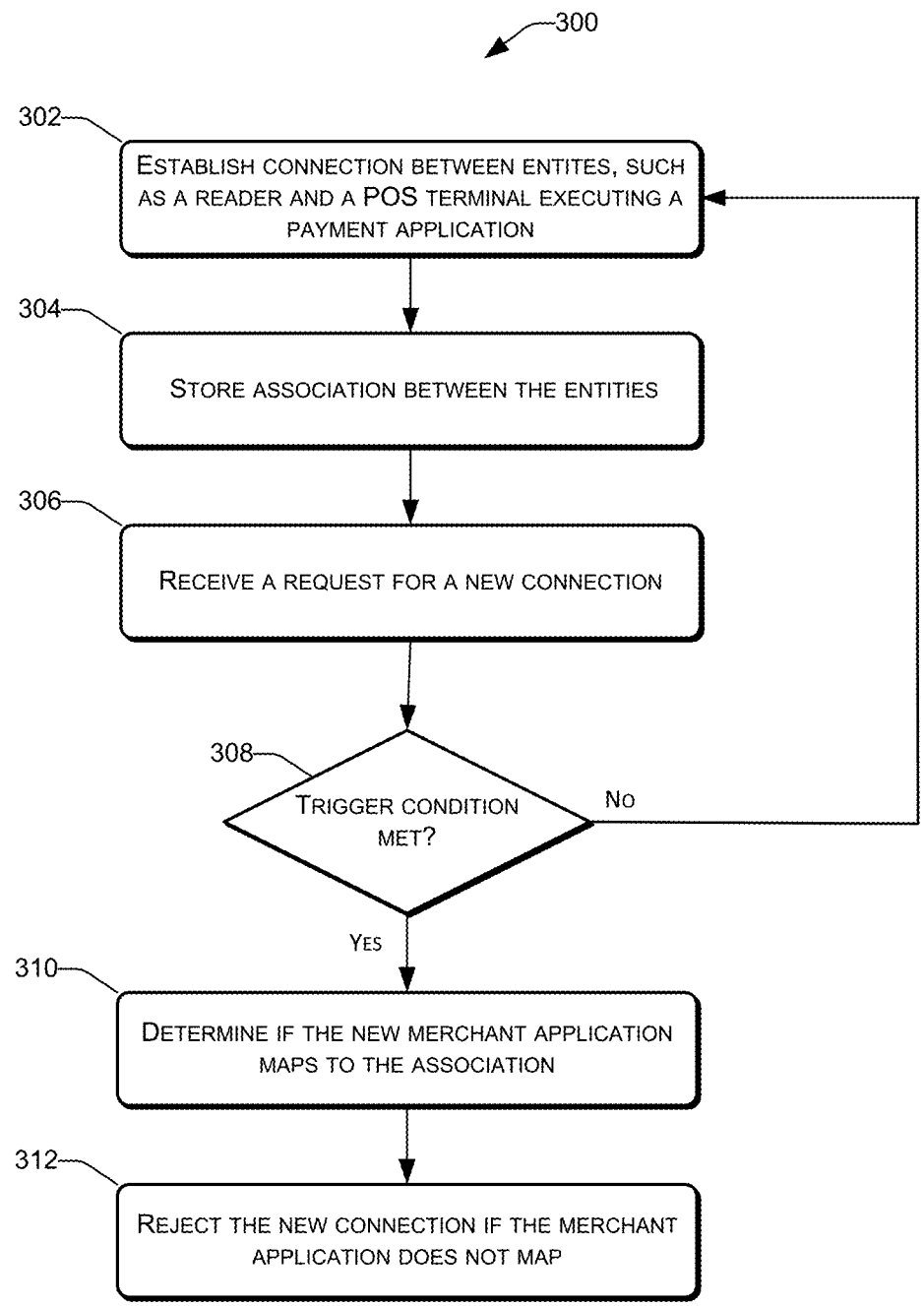
FIG. 4 depicts a non-limiting flow diagram illustrating a method for detecting an entry of a fraudulent payment reader in an environment including the POS terminal.
Figure 5A:
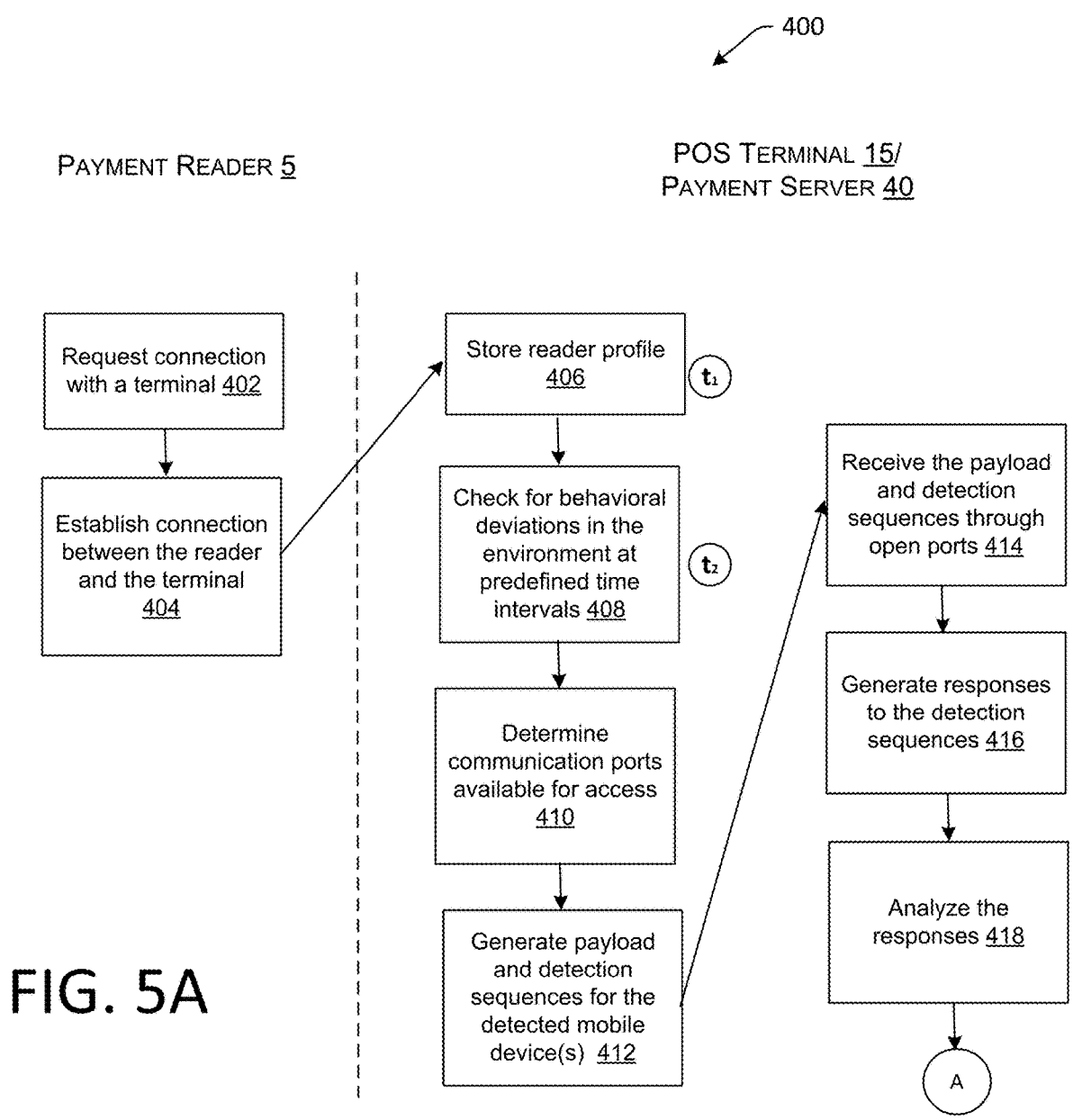
FIGS. 5A and 5B depict a non-limiting flow diagram illustrating a method for detecting an attempt of spoofing a merchant account, in accordance with some embodiments of the present disclosure.
Figure 5B:
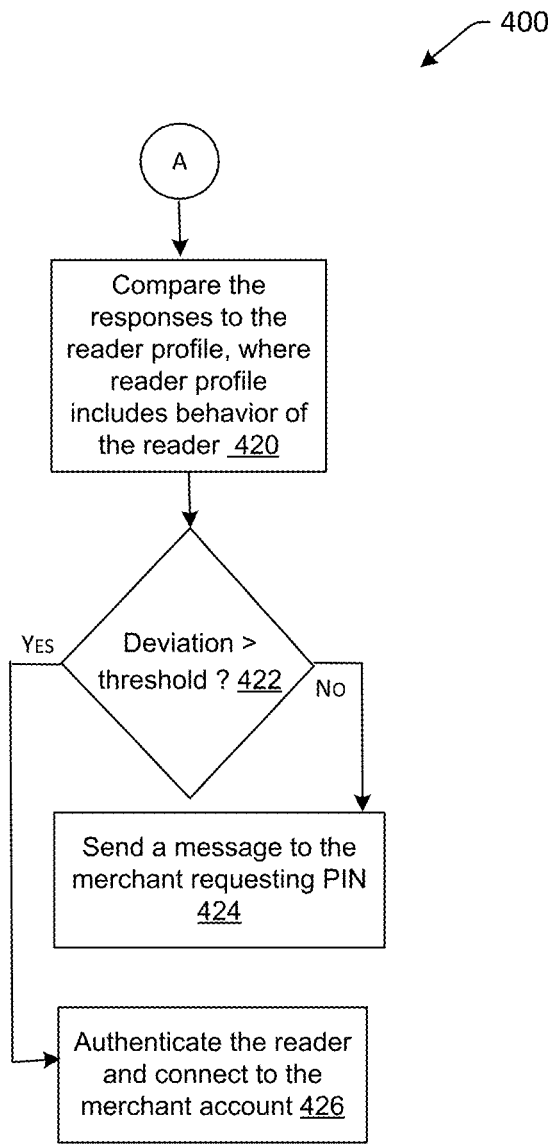
Figure 6:
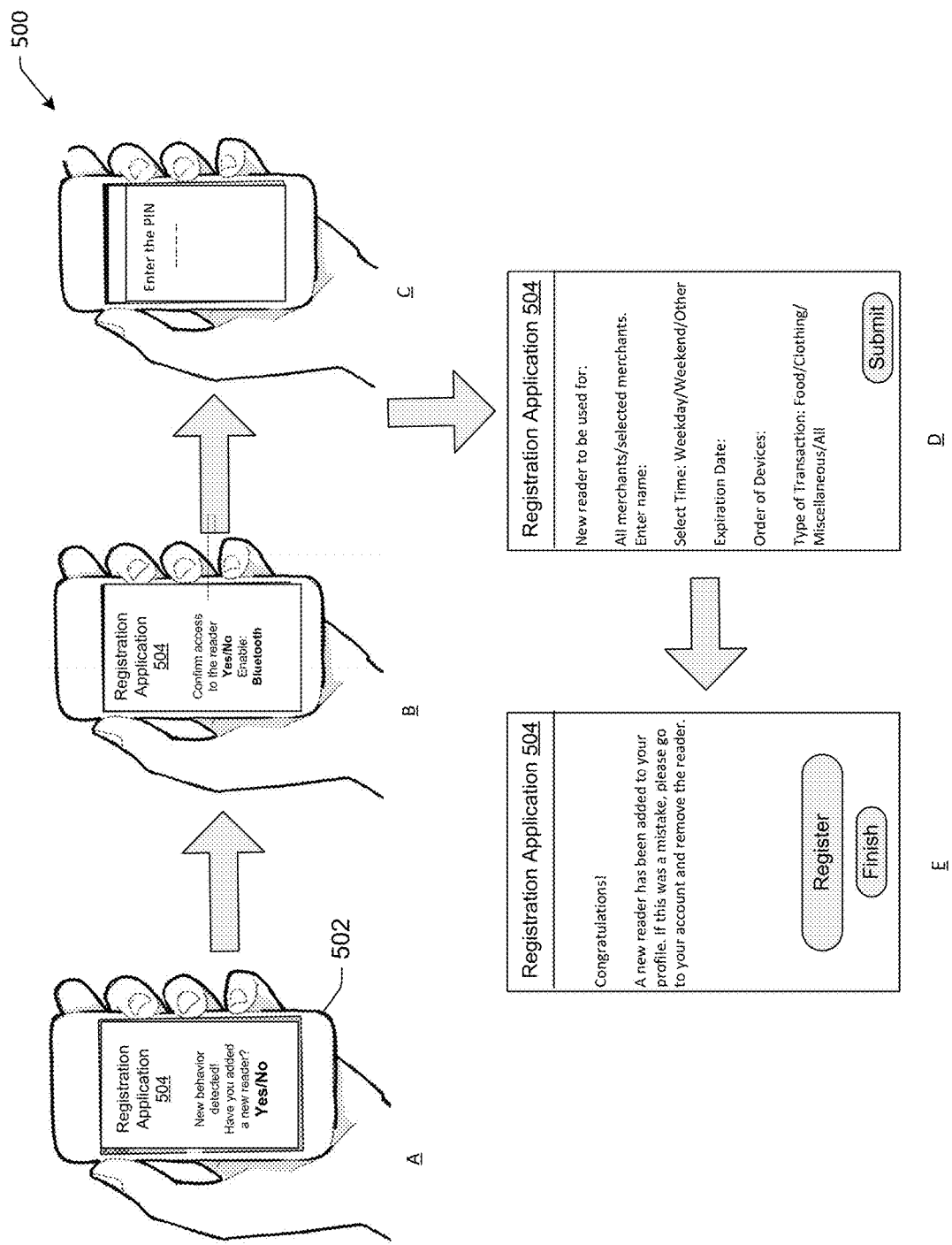
FIG. 6 depicts user interfaces illustrating various notifications sent on a mobile device of the merchant indicating to the merchant that a behavioral change has occurred with respect to the payment readers, in accordance with some embodiments of the present disclosure.

In view of the structures and devices described supra, methods that can be implemented in accordance with the disclosed subject matter will be better appreciated with reference to the flowcharts of FIGS. 4-6. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 4 depicts a flow diagram illustrating steps for detecting conditions that indicate fraud, in accordance with some embodiments of the present disclosure. Although configuration parameters may be exchanged and modified in any suitable manner, in an embodiment a payment reader 5 may be a custom device that may have lower-level access to configuration parameters of a BLE connection (e.g., through communications between processing unit 120 of reader chip 100 and processing unit 130 of wireless interface 108) than an application running on a POS terminal 15, which may be a smart phone, table, terminal, or other device with an operating system such iOS, Android, or Windows.

At step 302, a payment reader 5 and a POS terminal 15 may establish a BLE connection. Although a BLE connection may be established in any suitable manner, in an embodiment the BLE connection may be established through advertising messages to request pairing. Processing may then continue to step 304.

At step 304, a payment server stores the association of the terminal and reader connections in a data structure. Multiple readers can be connected to a terminal and a payment application thereon. One payment application corresponds to one merchant or one merchant financial account, as per one implementation. Processing may then continue to step 306.

At step 306, the server may receive the request for connection to a new merchant account, possibly fraudulent or spoof, thus triggering step. Once the requested information has been accessed, processing may continue to step 308.

At step 308, processor determines whether there is a trigger condition, such as addition of a new reader, new merchant application, new account holder, etc., that warrants a new check. If the condition is met, the flow transitions to step 310, otherwise the connection is enabled as per step 302.

At step 310, the server determines if the new merchant application or merchant maps to the stored associations or any of the previously stored associations. If the information does not corroborate with stored values, the server rejects the request for new connection as per step 312 and informs the merchant, such as the primary merchant, that a request for connection is being made.

FIGS. 5A and 5B are sequence flows illustrating an example process 400 of a method of registering a reader as an authorized reader with a payment processing system, according to an embodiment of the present subject matter.

The process 400 can be performed by one or more components, devices, or components such as, but not limited to, the mobile device, the payment service system, merchant device or POS terminal, the payment reader, or payment beacon or other components or devices. For the sake of explanation, the description hereinafter is described with reference to components described in FIGS. 1-3. It will be understood that the method can be carried out by any component of the payment system, e.g., the POS terminal, PSS or both, for example contemporaneous to the payment reader.

The process 400 starts with the operation at block 402. A merchant having a reader presents a reader for connection. The merchant accesses a merchant application to initiate registration. The merchant establishes connection between the reader and the terminal, for example a Bluetooth connection. As part of the connection, the relationship between the merchant, the payment application, financial account and reader information is stored either locally on a merchant terminal 15 or on a server 40. This information is then looked up if another reader attempts to connect with the merchant application or terminal. The relationship may also store the location coordinates of the reader and other device and behavioral characteristics, explained before, as reader profile in step 406. It will be understood that at the time of registration, the behavior of a reader may not be known. Such data is constantly and periodically updated as the behavior of a reader is learned. Behavioral characteristics include locations where the reader moves, the items purchased through the reader, the time when the reader is active, and so on. This step may be performed when the merchant attempts to register a reader and associate with an account, for example at time t1.

At time t2, or contemporaneous to the above step, the payment terminal, as part of routine or in response to a trigger condition such as detection of a new device in the near field range, scans the environment to collect state of readers, and in effect, a "new" reader profile (step 408). To collect reader profile, both for the reader at the time of registration and in response to a trigger condition, the following steps may be performed. The entry of a new device, such as an unknown reader, may be detected through location detection techniques, such as techniques based on angulation, lateration, proximity detection, dead reckoning, geo-fence, global or local positioning systems, Bluetooth Technology, Near-Field Communication Technology, sensors-based technology, Radio frequency identification (RFID) system, or the like. In one embodiment, the present subject matter enables automatic geo-fence establishment and activation. According to the present subject matter, the geo-fence is defined and established based on a current location of an asset, for example using GPS data comprising latitude and longitude along with some predetermined area based on range or distance. In this manner, the user need not manually specify a location by drawing a perimeter, specifying a point location, or by any other means.

This step of detecting location of the devices with respect to the location of the POS terminal may be performed contemporaneous to the step of registration. Additionally, the terminal can use buyer location to further zero in on the device that is most likely to be the merchant's (step 408).

The POS terminal then determines how it can interact with the devices. The POS terminal detects devices that are within a communication range dictated by a communication protocol, for example, wireless or RF protocol. Then the POS terminal establishes communication channels with all or selected readers or other devices in its communication range. For this, the POS terminal sends preliminary signals or data to explore communication ports in the device, which are available (step 410). Accordingly, the device detection component 228 of the terminal generates payload and/or detection sequences adapted based on the available communication ports and in accordance with the communication protocols on which the ports operate (step 412). The detection sequences can be in the form of specific signals requesting the device to respond in a certain way. The detection sequences can also be information-gathering requests configured to obtain device fingerprints from the readers. Device fingerprints include radio, location, mechanical or operational fingerprints—such as radiated performance, device defects, sensor performance, communication speed or lags, spectrum data, behavior, movement history and the like.

The targeted reader receives the payload and detection sequences via the appropriate communication ports and protocols (step 414) and responds accordingly. For example, the detection sequences can be queries to which the device responds with a yes or a no. In another example, the detection sequences dictates how the payload can be sent to a particular component of the device, such as the sensors, to evaluate its performance. The detection sequences also include instructions to send the information back to the requestor, in this case the terminal. In some cases, the responses may be encoded at the device level by appending randomly generated tokens to generate a new reader profile.

The readers can apply tokenized pseudo-random numbers (also referred to as hash keys) to the feature vectors to generate the device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, such as hash functions, such as MD, RIPEMD, and SHA. (Step 416.)

The responses form the digital device fingerprints, which are to be used for device identification and association of a reader as a registered reader and analyzed at step 418. The analysis involves decryption of the responses and generation of behavior or trends based on the responses. For example, the analysis involves comparison of the new behavior with an existing reader profile to see if there are any deviations. A threshold or confidence score is also set to compare the deviation with.

In one embodiment, the server 40 or terminal then compares the deviation with the threshold (step 420). If the match operation (step 422) as a result of the comparison at step 420 yields a "Yes," the flow transitions to step 426, where the new reader is authenticated as being previously registered or otherwise not fraudulent. However, if the match operation (step 422) yields a "No," the flow transitions to step 424 where the merchant is sent a notification on his device indicating a potential attempt to fraudulently add a new reader or payment application to the merchant's account or the merchant is asked to key in a card verification value or some other kind of authentication code into a field in the terminal's display message. The code is also saved in the device-object relationship and is retrieved every subsequent time the device alone is used as a means for authenticating a payment transaction. The decision of whether or not a new device is potentially fraudulent is thus determined, for example, based on deviation in known behavior of a merchant environment of readers and terminals and their interaction with each other. Any anomaly therein is indicative of a potentially fraud event.

While the description hereinafter discusses readers and their movement as a tool for detection of a fraudulent behavior, it will be understood that any other device or instrument that uniquely identifies a behavioral change can be used. Further, the device fingerprinting as described herein can be used for card authentication, targeted advertising, delivering rewards and coupons, establishing pre-orders, facilitating delivery of orders, and the like. The reader or their behaviors, when registered, enables the merchant to pay receive payment without having to worry about a fraudster swapping the portable readers. Owing to the unique and personalized nature of reader behaviors with respect to the payment terminal, payment transactions are less vulnerable to frauds. The use of readers in conjunction with POS terminal and/or mobile payment applications makes it virtually impossible to feign or replicate the combination. Further, the fraud detection technique leveraging the registered reader profile is friction-less, quicker, easier, more efficient, and more convenient especially when compared to traditional methods of payment that require manual checks. Further, according to the present subject matter, it is possible the methods and systems to determine fraud by confirming behavior of not just one, but a cluster of readers and other devices in proximity to the POS terminal. So, the payment transaction is authenticated when both a wearable watch and mobile phone, previously registered to represent the buyer, are present. If the wearable watch or the mobile phone is missing, the transaction maybe denied. This clustering leads to a more robust design of authentication.

FIG. 6 is a sequence flow diagram 600 that illustrates an example registration flow showing graphical interfaces on a merchant device, such as POS terminal 15, according to an embodiment of the present subject matter. Once registered, the device can be used in various interactions, for example in authentication or authorization of another reader or payment application, to target a merchant with offers, for customized advertising, for pre-orders, for delivery of pre-orders, and the like.

The sequence flow method 600 is applicable both in embodiments in which the registered device characteristic stays resident solely on the payment object reader and also in embodiments in which the registered device characteristic is transmitted from the mobile device or the payment object reader to payment server, according to embodiments of the present subject matter. For ease in understanding, assume that the merchant implements reader fingerprinting to detect anomalies in environment, such as those introduced, unbeknownst to the fraudulent user, by a fraudulent user. Even though events A-E, in one example scenario, are in sequence; other sequences are also possible.

The user interfaces A-E may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. The user interfaces may be used to provide a baseline and means of accessing and displaying information graphically to users. The user interface may also be a graphic user interface as provided by, with, and/or atop operating systems and/or operating environments such as discussed herein.

In various embodiments, the user interface is relayed on an audio or video display with a touch screen and driver, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), a thin film transistor (TFT) display, Plasma display, trans-reflective (Pixel Qi) display, electronic ink display (e.g. electrophoretic, electrowetting, interferometric modulating).

In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status.

To detect and validate whether a merchant's reader is registered with a payment terminal is disclosed herein. Once detected in a payment terminal's proximity, the POS terminal receives or generates a message to confirm if the person associated with the device is requesting a change in reader configuration, either by adding or removing an existing reader or a payment application. This is particularly helpful if there are several readers and a fraudulent user is attempting to either hack a payment application or swap one of the merchant readers with their own. The user interface A of the POS terminal 602 reflects an example message "Ne behavior detected. Are you trying to attempt a new reader?" The messages shown may be generated in a messaging application 604 or as part of a text or email notification.

The user interface B of the POA terminal 602 presents the user with another message to confirm if they allow the payment object reader to access the device to obtain device characteristics. At this time, the payment object reader through the mobile device 602 can also display a message to indicate additional device configuration changes that need to be made to allow the payment object reader to access the components embedded in the device. For example, the payment object reader determines that connection via Bluetooth and NFC is not available. The reader establishes a Wi-Fi connection with the device, and indicates in the message to enable NFC and Bluetooth. This too can be part of the user interface B. For example, the message can be of the form "confirm access to the reader and enable Bluetooth and NFC."

The user interface C of the payment terminal 602 requests the user to enter the password or CVV or the like associated with the payment object to allow registration of the new and recognized reader with the payment terminal. At this time, the payment terminal obtains device characteristics, e.g., physical, mechanical, location, magnetic, electro-mechanical, or operational characteristics, or a combination thereof and stores the relationships of the payment reader with the characteristics, encoded or not, in a database, either within the payment object reader or associated with the payment terminal or payment processing system.

The user interface D of the payment terminal 602 presents the user with options to set conditions or limits to the use of device as a payment instrument. For example, another user such as the account holder can specifies one or more conditions (restrictions) to be applied to the beneficiaries or the buyer's use of the device as an authentication mechanism. The conditions can include, for example, conditions upon the time and/or manner of use of the device. Conditions on the time of use of the device can include, for example, limiting to or exclusion of specific dates or date ranges, specific days of the week, specific time ranges within a day (e.g., "11:00 AM to 2:00 PM" or "lunchtime"), etc., or any combination thereof. In case of multiple buyer devices, the conditions may relate to the order or combination in which the devices should be present. Conditions on the manner of use of the device can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. Further, the buyer can be allowed to specify exceptions to some or all of the conditions. Hence, the conditions can be in the form of a whitelist (allowable items), or a blacklist (non-allowable items), or a combination thereof. At least some of the conditions may be hyperlinked to take the funder to additional pages/screens, to allow the funder define more-specific conditions. Thus, an owner can set conditions on what employees can purchase with a reader.

The user interface E of the mobile device 602 presents the user a message confirming successful registration of a reader based on a detected anomaly in reader profile. Such notification can also be sent as verification on merchant's email address, phone number and other communication identifiers connected to merchant account. It will be understood the user interfaces A-E are only for the purpose for illustration. The content, format and layout may vary from one device and one operating system to another. Further the content can vary based on various factors such as the method of device fingerprinting, and rules set by the merchant or customer or both.

While the embodiments described herein may relate to brick-and-mortar retails stores using POS terminals, including self-checkout terminals, it will be understood that the embodiments can be extended to shopping at any e-commerce location, including online shopping via merchant websites or applications.

Various embodiments and implementations of the disclosed fraud detection technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, employees, or other agents of the merchant and thus no distinction is made herein unless specifically discussed. In addition, as used herein, a buyer may include any entity that acquires goods or services from a merchant, such as by purchasing, renting, leasing, borrowing, licensing, or the like. As used herein, goods and/or services offered by merchants may be referred to as items. Thus, a merchant and a buyer may interact with each other to conduct a transaction in which the buyer acquires an item from a merchant, and in return, the buyer provides payment to the merchant, for example through a biometric payment instrument.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment proxy. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card' or 'payment instrument' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on.

The term 'biometric payment instrument' is a type of payment instrument or financial instrument that is biometrically identifiable and initialized by a biometric characteristic, such as a person's finger (e.g., for fingerprint recognition), face, iris or retina, heartbeat, voice, etc.

The term "landing page," as used here, refers to a virtual location identified by a location address that is dedicated to collect payments on behalf of a recipient associated with the location address. In some embodiments, the landing page is identified by a graphical user interface (GUI) of a mobile payment application installed on a client device of the sender. The landing page is generated by the payment service system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application. The sender can further enter a payment amount at the GUI and send the money, e.g., by selecting a "Pay" action button displayed on the GUI.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A computer-implemented method for sending a notification in response to a change in behavior of a payment object reader, the computer-implemented method comprising:
   obtaining, via a processor of a payment server associated with a payment service system, an original state of the payment object reader based on a behavioral model, wherein the behavioral model defines the original state based on expected behavior of the payment object reader, and wherein the payment object reader is registered as an authorized reader with the payment service system and paired to a point-of-sale (POS) terminal associated with a merchant;
   detecting a change from the original state of the payment object reader;
   comparing the change from the original state with a threshold deviation defined by the behavioral model; and
   upon determining that the change from the original state is not within the threshold deviation, transmitting, via a communication identifier associated with an account of the merchant with the payment service system, a notification to a mobile device associated with the merchant indicating an existence of an anomalous state of the payment object reader.

2. The computer-implemented method of claim 1, wherein the POS terminal stores data associated with the behavioral model.

3. The computer-implemented method of claim 1, wherein the behavioral model includes one or more device characteristics including timing parameters, radiated performance, wireless performance, quality of communication links, radio frequency response, transmission measurements, receiver measurements, or engineering tolerances.

4. The computer-implemented method of claim 1, further comprising:
   before detecting the change from the original state, checking the behavior of the payment object reader at least partly in response to receiving an indication of an occurrence of at least one trigger condition, wherein the trigger condition comprises at least one of: (a) introducing another payment object reader in proximity to the payment object reader; (b) accessing a payment account associated with the payment object reader; (c) physically swapping the payment object reader with the other payment object reader; (d) changing location of the payment object reader; (e) performing a payment transaction using the other payment object reader in proximity to the payment object reader; (f) performing a payment transaction using the other payment object reader in proximity to the payment object reader about a time when another payment transaction is in progress at the payment object reader; (g) performing a payment transaction for an amount that is more than a predefined amount; or (h) introducing another payment object reader in a geographical perimeter.

5. The computer-implemented method of claim 1, wherein the original state includes an external state of the payment object reader as sampled by one or more sensors, wherein the external state includes at least one of:
   a geographical or physical location of the payment object reader;
   a linear or angular velocity or acceleration of the payment object reader;
   a directional heading of the payment object reader;
   a temperature external to the payment object reader;
   a tilt or rotation of the payment object reader;
   an intensity of light external to the payment object reader;
   a level of sound external to the payment object reader; or
   a time.

6. The computer-implemented method of claim 1, further comprising generating the behavioral model, wherein the generating comprises:
   obtaining at least one characteristic corresponding to the payment object reader, wherein the at least one characteristic is related to operational or physical features of the payment object reader;
   tracking the at least one characteristic over a period of time; and
   analyzing the tracked characteristic to generate the behavioral model.

7. The computer-implemented method of claim 1, wherein the change from the original state is triggered by another payment object reader not authorized by the merchant, and the computer-implemented method further includes establishing a communication channel between the payment object reader or the other payment object reader and the payment server, wherein the establishing includes:
   detecting a list of available communication ports of the payment object reader; and
   selecting a communication port from amongst the available communication ports for communicating with the payment object reader to obtain the original state or the change from the original state.

8. The computer-implemented method of claim 1, wherein detecting the change from the original state includes detecting at least one of:
   a disconnection from or a reconnection of the payment object reader to a payment server;
   a disconnection from or a reconnection of the payment object reader to a different network connection;
   a change in a signal strength corresponding to the payment object reader;
   a change in movement behavior or location of the payment object reader;
   an introduction of another payment object reader in a predetermined geographical perimeter;
   a removal of the payment object reader from the predetermined geographical perimeter; or
   an ability or inability to communicate with the payment server.

9. The computer-implemented method of claim 1, wherein the original state of the payment object reader includes an internal state of the payment object reader that includes information sampled from at least one of internal hardware or software monitors in the payment object reader.

10. The computer-implemented method of claim 1, wherein the behavioral model includes a predicted future state of the payment object reader, and the computer-implemented method further includes:
    obtaining one or more current or past states corresponding to the payment object reader; and
    projecting the predicted future state of the payment object reader based on the obtained current or past states.

11. The computer-implemented method of claim 10, further comprising factoring the predicted future state in determining a deviation of the payment object reader from the original state.

12. The computer-implemented method of claim 1, wherein the communication identifier comprises at least one of a group of a name, an address, an email address, a phone number, or a payment application executing on the mobile device.

13. The computer-implemented method of claim 1, further comprising:
   upon determining that the change from the original state is within the threshold deviation, updating the behavioral model to include information corresponding to the payment object reader.

14. The computer-implemented method of claim 1, wherein the change from the original state is triggered by another payment object reader not authorized by the merchant, and wherein the notification includes a prompt for an authorization code to authenticate the payment object reader.

15. The computer-implemented method of claim 1, wherein the change from the original state is triggered by another payment object reader not authorized by the merchant and wherein the behavioral model includes one or more conditions to be applied during authorization of the other payment object reader, wherein the conditions include at least one of:
   a time period within which the payment object reader is authorized;
   a particular merchant requesting the authorization;
   a particular category of the merchant requesting the authorization;
   a particular location from where a buyer is requesting the authorization;
   a predefined limit of the authorization;
   an identity of the merchant associated with the other payment object reader; and
   a particular type of goods or services corresponding to a payment transaction.

16. The computer-implemented method of claim 1, wherein:
   detecting the change from the original state of the payment object reader comprises detecting swapping of a first payment card reader associated with the merchant with a second payment card reader that, at the time of detection, is not associated with the merchant; and
   the computer-implemented method further comprises:
      canceling one or more transactions involving the second payment card reader; and
      automatically disabling connection between the second payment card reader and a point-of-sale (POS) terminal associated with the merchant.

* * * * *